United States Patent
Adachi et al.

(10) Patent No.: US 9,111,346 B2
(45) Date of Patent: Aug. 18, 2015

(54) IMAGE PROCESSING APPARATUS, IMAGE PROCESSING METHOD, AND RECORDING MEDIUM

(75) Inventors: Keiji Adachi, Kawasaki (JP); Yasuo Bamba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 439 days.

(21) Appl. No.: 13/594,422

(22) Filed: Aug. 24, 2012

(65) Prior Publication Data

US 2013/0064424 A1 Mar. 14, 2013

(30) Foreign Application Priority Data

Sep. 13, 2011 (JP) .................................. 2011-199935
Mar. 9, 2012 (JP) .................................. 2012-053683

(51) Int. Cl.
*G06K 9/00* (2006.01)
*G06T 7/00* (2006.01)

(52) U.S. Cl.
CPC ..... *G06T 7/0044* (2013.01); *G06T 2207/30196* (2013.01)

(58) Field of Classification Search
CPC .......... G06K 9/00281; G06K 9/00248; G06K 9/3241; G06K 9/4642; G06K 9/00335; G06K 9/00624; G06T 2207/10016; G06T 7/2006; G06T 2207/30196; G06T 2207/20021
USPC .......................................... 382/103, 104, 118
See application file for complete search history.

(56) References Cited

U.S. PATENT DOCUMENTS

| 7,623,152 | B1 * | 11/2009 | Kaplinsky | 348/208.16 |
|---|---|---|---|---|
| 7,873,221 | B2 | 1/2011 | Okada et al. | |
| 7,925,050 | B2 * | 4/2011 | Nagaoka et al. | 382/104 |
| 8,812,344 | B1 * | 8/2014 | Saurabh et al. | 705/7.29 |
| 2006/0204053 | A1 * | 9/2006 | Mori et al. | 382/118 |
| 2007/0110321 | A1 * | 5/2007 | Okada et al. | 382/209 |
| 2007/0165951 | A1 * | 7/2007 | Akahori et al. | 382/195 |
| 2007/0201747 | A1 * | 8/2007 | Yamada et al. | 382/199 |
| 2008/0100709 | A1 * | 5/2008 | Furukawa | 348/169 |
| 2009/0220156 | A1 * | 9/2009 | Ito et al. | 382/201 |
| 2009/0245634 | A1 * | 10/2009 | Matsuzaka | 382/167 |
| 2010/0085385 | A1 * | 4/2010 | Nagamasa | 345/660 |
| 2010/0232657 | A1 * | 9/2010 | Wang | 382/118 |
| 2010/0329565 | A1 * | 12/2010 | Kunieda | 382/190 |

FOREIGN PATENT DOCUMENTS

CN 1170178 A 1/1998
CN 101281599 A 10/2008
(Continued)

OTHER PUBLICATIONS

U.S. Appl. No. 13/482,824, filed May 29, 2012, Applicant: Yasuo Bamba.

(Continued)

*Primary Examiner* — Stephen R Koziol
*Assistant Examiner* — Shaghayegh Azima
(74) *Attorney, Agent, or Firm* — Fitzpatrick, Cella, Harper & Scinto

(57) ABSTRACT

An image corresponding to a pattern having a first size is detected from a first detection region in an acquired, first image, and an image corresponding to a pattern having a second size is detected from a second detection region different from the first detection region in the first image.

32 Claims, 19 Drawing Sheets

(56) References Cited

FOREIGN PATENT DOCUMENTS

| | | |
|---|---|---|
| CN | 102004918 A | 4/2011 |
| JP | 2002373332 A | 12/2002 |
| JP | 2007135115 A | 5/2007 |
| JP | 2009211311 A | 9/2009 |
| JP | 2010088093 A | 4/2010 |
| JP | 4626493 B2 | 2/2011 |

OTHER PUBLICATIONS

Chinese Office Action dated Dec. 18, 2014 in Chinese Patent Application No. 201210339883.

* cited by examiner

F I G. 1
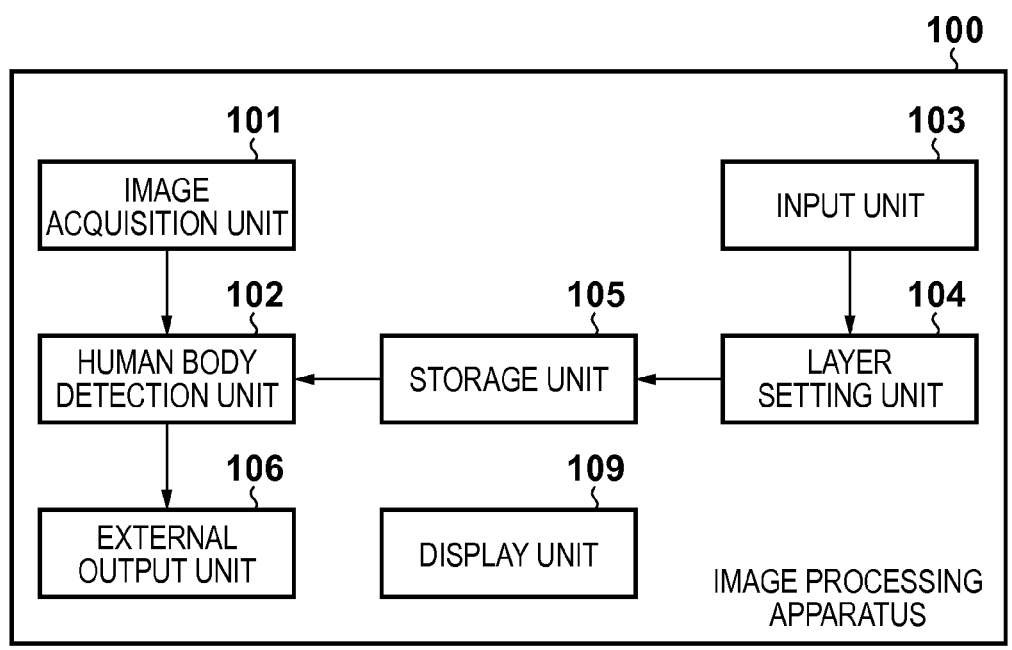

FIG. 4
| Region | Layer |
|--------|-------|
| R(1,1) | -     |
| R(1,2) | 0.1   |
| R(1,3) | 0.1   |
| R(1,4) | 0.1   |
| R(2,1) | 1.2   |
| R(2,2) | 1.2   |
| R(2,3) | 1.2   |
| R(2,4) | 1.2   |
| R(3,1) | 3.4   |
| R(3,2) | 3.4   |
| R(3,3) | 3.4   |
| R(3,4) | 3.4   |
FIG. 5A
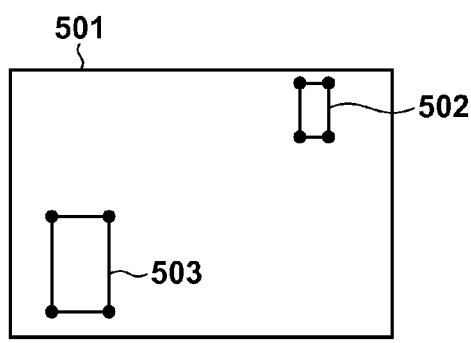
FIG. 5B
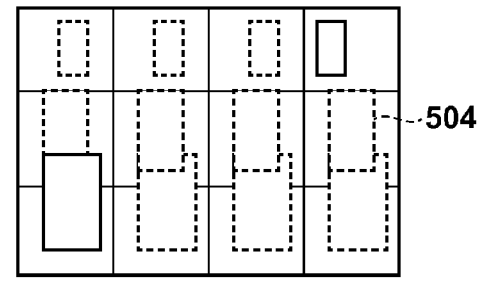

FIG. 12

| Region | L0 | L1 | L2 | L3 | ... | L(n-1) | Ln |
|--------|----|----|----|----|-----|--------|----|
| R(1,1) | 3 | 3 | 1 | 0 | ... | 0 | 0 |
| R(1,2) | 5 | 4 | 3 | 0 | ... | 0 | 0 |
| R(1,3) | 6 | 5 | 2 | 0 | ... | 0 | 0 |
| R(1,4) | 5 | 4 | 2 | 0 | ... | 0 | 0 |
| R(2,1) | 0 | 4 | 6 | 0 | ... | 0 | 0 |
| R(2,2) | 1 | 3 | 6 | 0 | ... | 0 | 0 |
| R(2,3) | 0 | 3 | 5 | 0 | ... | 0 | 0 |
| R(2,4) | 0 | 3 | 3 | 0 | ... | 0 | 0 |
| R(3,1) | 0 | 0 | 0 | 1 | ... | 0 | 0 |
| R(3,2) | 0 | 0 | 1 | 4 | ... | 0 | 0 |
| R(3,3) | 0 | 0 | 2 | 5 | ... | 0 | 0 |
| R(3,4) | 0 | 0 | 0 | 2 | ... | 0 | 0 |

F I G. 18

| Region | Layer |
|---|---|
| ENTIRE REGION | {L2, L3} |

FIG. 20

| region \ layer | L0 | L1 | ... | Ln |
|---|---|---|---|---|
| R(1, 1) | (5, 3, 1) | (3, 3, 0) | ... | (0, 0, 0) |
| R(1, 2) | (18, 14, 1) | (12, 19, 1) | ... | (0, 0, 0) |
| R(1, 3) | (16, 12, 0) | (11, 7, 3) | ... | (0, 0, 0) |
| R(1, 4) | (15, 10, 3) | (14, 8, 4) | ... | (30, 0, 28) |
| R(2, 1) | (6, 4, 2) | (22, 19, 0) | ... | (0, 0, 0) |
| R(2, 2) | (4, 3, 1) | (25, 20, 2) | ... | (0, 0, 0) |
| R(2, 3) | (2, 2, 0) | (18, 15, 1) | ... | (0, 0, 0) |
| R(2, 4) | (3, 2, 0) | (15, 4, 8) | ... | (16, 0, 13) |
| R(3, 1) | (1, 1, 0) | (5, 4, 1) | ... | (2, 1, 1) |
| R(3, 2) | (2, 0, 1) | (6, 4, 2) | ... | (3, 2, 0) |
| R(3, 3) | (2, 1, 1) | (3, 2, 1) | ... | (1, 0, 1) |
| R(3, 4) | (0, 0, 0) | (2, 1, 1) | ... | (4, 3, 0) |

FIG. 21

| Region | Layer |
|---|---|
| R(1, 1) | { } |
| R(1, 2) | {L0, L1} |
| R(1, 3) | {L0, L1} |
| R(1, 4) | {L0, L1} |
| R(2, 1) | {L1, L2} |
| R(2, 2) | {L1, L2} |
| R(2, 3) | {L1, L2} |
| R(2, 4) | {L1, L2} |
| R(3, 1) | {L3, L4} |
| R(3, 2) | {L3, L4} |
| R(3, 3) | {L3, L4} |
| R(3, 4) | {L3, L4} |

IMAGE PROCESSING APPARATUS, IMAGE PROCESSING METHOD, AND RECORDING MEDIUM

BACKGROUND OF THE INVENTION

1. Field of the Invention

The present invention relates to a technique for detecting an object from an image.

2. Description of the Related Art

Conventionally, specific objects such as a face and a human body from an image captured by a monitoring camera are detected by a pattern matching process. Japanese Patent Laid-Open No. 2009-211311 describes an image processing apparatus which extracts a plurality of local patterns using a collation pattern in the entire region of an image while changing the size of the image, thereby calculating local feature amounts. This image processing apparatus determines whether the detected object is a human body, based on the sum total of the weighted local feature amounts.

As a method of speeding up a detection process for these specific objects, a method of switching the priority level of a reduced image (layer) used in pattern matching, based on the past image capturing results, has been described in Japanese Patent Laid-Open No. 2007-135115.

However, especially a monitoring camera mainly captures a wide range in the depth direction in most cases, and therefore often obtains a scene in which large and small objects are mixed in the same screen, so the objects do not always have the same size in this screen.

Under the circumstances, to detect all objects to be detected, it is necessary to use collation patterns corresponding to small and large objects. It is therefore eventually impossible to perform a detection process at high speed even when the priority level of a reduced image (layer) used in a collation process is changed.

SUMMARY OF THE INVENTION

The present invention has been made in order to solve the above-mentioned problem, and provides a technique for achieving specific object detection at high speed, regardless of the size of an object to be detected in an image.

According to the first aspect of the present invention, an image processing apparatus comprising: an acquisition unit which acquires an image; and an image detection unit which detects an image corresponding to a pattern having a first size from a first detection region in a first image acquired by the acquisition unit, and detects an image corresponding to a pattern having a second size from a second detection region different from the first detection region in the first image.

According to the second aspect of the present invention, an image processing method comprising: an acquisition step of acquiring an image; and an image detection step of detecting an image corresponding to a pattern having a first size from a first detection region in a first image acquired in the acquisition step, and detecting an image corresponding to a pattern having a second size from a second detection region different from the first detection region in the first image.

According to the third aspect of the present invention, a recording medium recording a program to be executed by a computer, the program comprising: an acquisition step of acquiring an image; and an image detection step of detecting an image corresponding to a pattern having a first size from a first detection region in a first image acquired in the acquisition step, and detecting an image corresponding to a pattern having a second size from a second detection region different from the first detection region in the first image.

Further features of the present invention will become apparent from the following description of exemplary embodiments with reference to the attached drawings.

BRIEF DESCRIPTION OF THE DRAWINGS

FIG. 1 is a block diagram illustrating an example of the functional configuration of an image processing apparatus in the first embodiment;

FIG. 4 is a table illustrating an example of the configuration of a correspondence table in the first embodiment;

FIG. 5A is a view illustrating an example of how to set frames which surround objects;

FIG. 5B is a view illustrating an example of a method of obtaining an assumed object size;

FIG. 12 is a table illustrating an example of the configuration of a correspondence table in the third embodiment;

FIG. 18 is a table illustrating an example of a correspondence table in the fourth embodiment;

FIG. 20 is a table illustrating an example of a recording table assigned with evaluation information in the fifth embodiment;

FIG. 21 is a table illustrating an example of a correspondence table in the fifth embodiment.

DESCRIPTION OF THE EMBODIMENTS

First Embodiment

Figure 2A:
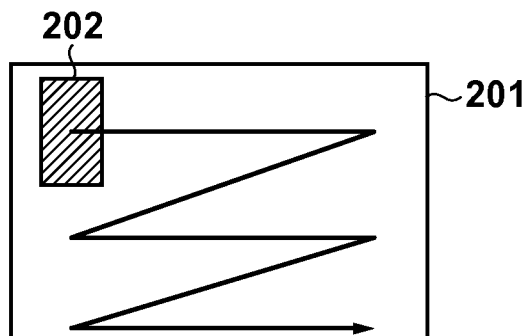
FIGS. 2A to 2C are views for explaining a pattern matching process.

An image processing apparatus according to this embodiment is applicable to an image processing circuit built into an image capturing apparatus such as a monitoring camera, and a computer apparatus such as a personal computer. An example of the functional configuration of the image processing apparatus according to this embodiment will be described first with reference to a block diagram shown in FIG. 1.

An image acquisition unit 101 acquires an externally supplied moving image or still image and sends it to a human body detection unit 102 in the succeeding stage. If the image acquisition unit 101 acquires a moving image, it sequentially sends images of respective frames which constitute the moving image to the human body detection unit 102. If the image acquisition unit 101 acquires a still image, it directly sends it to the human body detection unit 102. Note that the supply source of a moving image or still image is not particularly limited, and may be a server apparatus or image capturing apparatus which supplies a moving image or a still image via a wired or wireless channel. The supply source of a moving image or still image is not limited to an external apparatus, either, and a moving image or a still image may be acquired from a memory in the image processing apparatus. The following description assumes that the image acquisition unit 101 receives a single image in the human body detection unit 102, regardless of whether it acquires a moving image or a still image. In the former case, the single image corresponds to each frame which constitutes a moving image. In the latter case, the single image corresponds to a still image.

To detect objects having different sizes from an image (first image) supplied from the image acquisition unit 101, the human body detection unit 102 recursively reduces the first image to generate a plurality of images (second to N-th images) first. The first to N-th images will also be referred to as process layers hereinafter. The process layers will be described in detail later. The human body detection unit 102 collates each of the first to N-th images with a human body collation pattern to perform an object detection process. At this time, an image region associated with the m-th image (1≤m≤N) in advance among image regions in the m-th image is defined as a target image region. The human body detection unit 102 sets a rectangle region having a specific size at each position in the target image region to perform an object detection process for this rectangle region. Although the object is a human body in this embodiment, the following description is similarly applicable when the object is other than a human body. Also, although a known pattern matching technique which uses the above-mentioned human body collation pattern is employed in the object detection process, the object detection process may be implemented by employing other techniques.

A storage unit 105 holds (registers) a table (correspondence table) which associates image regions at positions in the first to N-th images, which are identical to each other, with one of the first to N-th images. When the human body detection unit 102 specifies as a target image region an image region associated with the m-th image (1≤m≤N) in advance among image regions in the m-th image, it looks up this correspondence table. The storage unit 105 also registers the above-mentioned human body collation pattern to be used in a human body detection process.

A layer setting unit 104 generates the above-mentioned correspondence table in accordance with operations input from an input unit 103. The input unit 103 is implemented by, for example, a keyboard and a mouse, and can receive various instructions as the user operates it.

A display unit 109 is implemented by, for example, a CRT or a liquid crystal screen, and can display various screens (to be described later). Note that the input unit 103 and display unit 109 may be integrated to implement a touch panel screen.

An external output unit 106 outputs the process result obtained by the human body detection unit 102. The output source is not limited to a specific output source, and this process result may be output to an external apparatus via a wired or wireless channel or output to the display unit 109. Also, information to be output may be output intact or output by some kind of visible graphics.

A process of performing pattern matching using a human body collation pattern for various images having different sizes (the first to N-th images in this embodiment) to detect objects from the images will be described next. To perform pattern matching upon placement of a human body collation pattern at respective positions in each image, a human body collation pattern 202 is placed at the upper left corner of an image 201 serving as a first image first, as shown in FIG. 2A. Note that the first image will also sometimes be referred to as process layer 0 (L0) hereinafter. After the human body collation pattern 202 is placed, its position is moved to the right and then downwards. Every time the human body collation pattern 202 is moved, pattern matching between the human body collation pattern 202 and an image region overlapping it is performed to detect a human body.

Figure 2B:
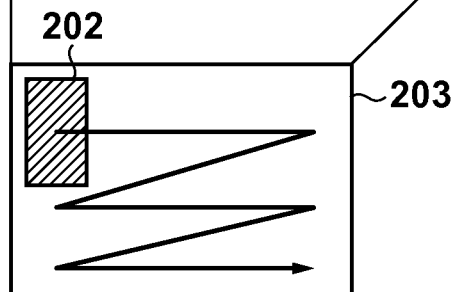

An image 203 is generated as a second image by reducing the first image at a predetermined ratio (a ratio lower than unit ratio) next, as shown in FIG. 2B. Note that the second image will also sometimes be referred to as process layer 1 (L1) hereinafter. The human body collation pattern 202 is placed at the upper left corner of the image 203 serving as a second image. After the human body collation pattern 202 is placed, its position is moved to the right and then downwards. Every time the human body collation pattern 202 is moved, pattern matching between the human body collation pattern 202 and an image region overlapping it is performed to detect a human body.

Figure 2C:
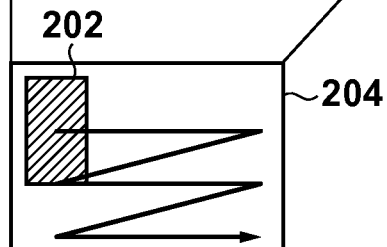

An image 204 is generated as a third image by reducing the second image at a predetermined ratio (a ratio lower than unit ratio) next, as shown in FIG. 2C. Note that the third image will also sometimes be referred to as process layer 2 (L2) hereinafter. The human body collation pattern 202 is placed at the upper left corner of the image 204 serving as a third image. After the human body collation pattern 202 is placed, its position is moved to the right and then downwards. Every time the human body collation pattern 202 is moved, pattern matching between the human body collation pattern 202 and an image region overlapping it is performed to detect a human body.

In this way, repeatedly using the same human body collation pattern for reduced images, various human bodies having different sizes in the images can be detected. Note that the process layers are a plurality of image sets which have different resolutions and are generated by enlarging or reducing an input image. As described earlier, the process layers in this embodiment are a plurality of process layer image sets, and reduced images are defined as process layer 1, process layer 2, . . . in ascending order of degree of reduction upon defining the original image as layer 0. Also, each process layer is associated with the size of the detected human body, as described above.

By repeatedly performing the above-mentioned processes, various human bodies having different sizes are detected, and the process ends after continuation for a specific time. Although the end of the process is determined based on the time elapsed from the start of the process in this embodiment, the condition in which the process is to end is not limited to this. The end of the process may also be determined based on, for example, the number of detected human bodies or the number of times of execution of a human body detection process.

Also, the reduction ratio at which process layer P (P≥1) is generated can be any ratio lower than unit ratio. The accuracy improves but the process time prolongs as the reduction ratio comes closer to unit ratio, while generally the accuracy degrades but the process time shortens as the reduction ratio lowers. Hence, an appropriate reduction ratio is desirably set in accordance with the conditions in which the process layers are used to execute a series of human body detection processes. Moreover, although human bodies are sequentially detected in descending order of size from an image group obtained by recursively reducing the first image in this embodiment, the order of processes may be changed so as to detect human bodies in ascending order of size.

Again, although the object is assumed to be a human body in this embodiment, it may be, for example, a face, a vehicle, or an animal. As long as a plurality of types of specific objects can be detected, and a plurality of objects can be detected simultaneously, a plurality of specific object detection processes may be performed for the objects.

Again, only a predetermined process may be performed by selecting it from a plurality of specific object detection processes in accordance with the object attributes used for the separately set setting values such as the object size and aspect ratio. Assume, for example, that human body detection and vehicle detection are performed as specific object detection operations. At this time, the size of a vehicle which may appear in the screen is set as a minimum vehicle size in advance in accordance with a user instruction. If the size of an object is smaller than the minimum vehicle size, the object is less likely to be detected as a vehicle, so only human body detection is performed without vehicle detection. On the other hand, if the size of an object is larger than the minimum vehicle size, the object is likely to be detected as a vehicle, so vehicle detection is performed. In this case, a plurality of persons who act as a group are also likely to be detected as a single object, so human body detection is also performed.

Figure 3:
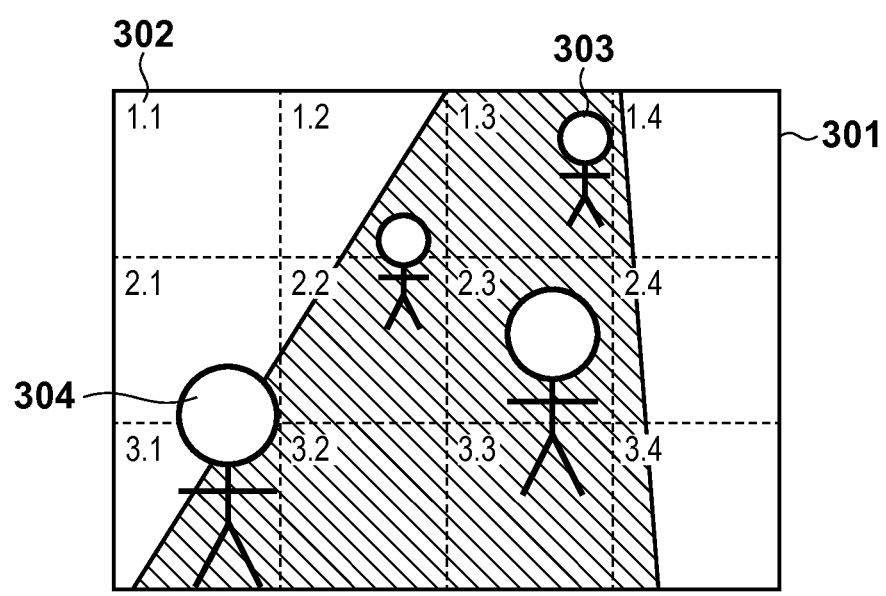
FIG. 3 is a view illustrating an example of how to divide an image.

Details of the above-mentioned correspondence table and the procedure of generating it will be described next. First, the layer setting unit 104 divides an image acquired by the image acquisition unit 101, that is, an image 301 serving as a first image into a plurality of rectangle regions (image regions) 302, as shown in FIG. 3. Although the image 301 is divided into 3 (vertical)×4 (horizontal) rectangle regions 302 in FIG. 3, the number of divided rectangle regions and the division pattern of the image are not limited to these specific ones. That is, the image need not always be divided equidistantly, or not the entire image but its partial region may be divided into a plurality of regions. Also, the shape of each divided region is not limited to a rectangle, and may have an arbitrary shape, including a polygonal shape set by the user.

To identify the rectangle regions 302, the layer setting unit 104 assigns identification numbers to them. Referring to FIG. 3, identification numbers (1, 1), (1, 2), (1, 3), and (1, 4) are assigned to the uppermost rectangle regions 302 in the order named from the left end. Also, identification numbers (2, 1), (2, 2), (2, 3), and (2, 4) are assigned to the middle rectangle regions 302 in the order named from the left end. Moreover, identification numbers (3, 1), (3, 2), (3, 3), and (3, 4) are assigned to the lowermost rectangle regions 302 in the order named from the left end.

Referring to FIG. 3, compared to a human body 304 captured across the rectangle regions having identification numbers (2, 1) and (3, 1), a human body 303 that falls within the rectangle region having identification number (1, 3) is positioned more to the back and therefore captured as a smaller object. In this embodiment, upon paying attention to this feature, a human body in a region in which it is captured as a relatively small object is detected from the first image, and a human body in which it is captured as a relatively large object is detected from an image obtained by reducing the first image, instead of performing human body detection processes for all rectangle regions in the first image.

The layer setting unit 104 displays on a display screen 501 of the display unit 109 the first image acquired by the image acquisition unit 101, as shown in FIG. 5A. The user operates the input unit 103 to set frames 502 and 503 which surround the human bodies captured in the first image. The frames 502 and 503 are sample rectangles indicating the sizes of human bodies to be detected. Also, each of the frames 502 and 503 has control points at the four corners, and its shape, size, and position in the first image can be changed. Note that the user may set frames with appropriate sizes and positions using the input unit 103, instead of displaying the first image on the display screen 501.

In either case, as shown in FIG. 5A, when the image has a depth, it is desired to set both small and large frames within the display screen. Referring to FIG. 5A, a small frame is set in the background of the display screen and a large frame is set in the foreground of the display screen.

When the user operates the input unit 103 to input information indicating completion of this setting, the layer setting unit 104 operates in the following way. First, the layer setting unit 104 obtains a frame (assumed object size) including a human body assumed when the human body is captured within each rectangle region in the first image, based on the size of at least one frame set on the display screen 501. Referring to FIG. 5B, the layer setting unit 104 obtains an assumed object size in each rectangle region by linear interpolation, based on the sizes of the frames 502 and 503 and the distance from the frame 502 to the frame 503. A frame 504 indicated by a dotted line has the obtained, assumed object size. In the example shown in FIG. 5B, an assumed object size equal to the size of the frame 502 is set in image regions (1. 1), (1. 2), and (1. 3) on the uppermost line on which the frame 502 set in image region (1. 4) by the user is present. Also, an assumed object size equal to the size of the frame 503 is set in image regions (3. 2), (3. 3), and (3. 4) on the lowermost line on which the frame 503 set in image region (3. 1) by the user is present. Moreover, an assumed object size obtained by linear interpolation based on the sizes of the frames 502 and 503 and the distance from the frame 502 to the frame 503 is set in image regions (2. 1), (2. 2), (2. 3), and (2. 4) on the middle line. In this way, a third detection region for detecting an image corresponding to a pattern having a third size in the image can be set in accordance with the distance between first and second designation regions. The human body detection unit 102 detects an image corresponding to a pattern having a third size from the third detection region in the acquired image.

A method of obtaining an assumed object size in each rectangle region is not limited to this. A frame (the frames 502 and 503 in FIG. 5A) set by the user, and a frame (the frame 504 in FIG. 5B) obtained by interpolation from the set frame will generically be referred to as object frames hereinafter.

When an object frame in each rectangle region is determined, the layer setting unit 104 generates the above-mentioned correspondence table which manages the correspondence between the identification number of each rectangle region and a process layer corresponding to an object frame obtained for this rectangle region, and registers it in the storage unit 105, as illustrated in FIG. 4.

The correspondence table illustrated in FIG. 4 corresponds to the first image shown in FIG. 3. In the first image shown in FIG. 3, a relatively small object frame is set for the uppermost rectangle regions, as shown in FIG. 5B. Hence, in this case, first and second images (process layers 0 and 1) serving as relatively large images are associated with the uppermost rectangle regions.

Also, in the first image shown in FIG. 3, an object frame larger than the object frame set for the uppermost rectangle regions is set for the middle rectangle regions, as shown in FIG. 5B. Hence, in this case, second and third images (process layers 1 and 2) serving as relatively small images compared to the images associated with the uppermost rectangle regions are associated with the middle rectangle regions.

Moreover, in the first image shown in FIG. 3, an object frame larger than the object frame set for the middle rectangle regions is set for the lowermost rectangle regions, as shown in FIG. 5B. Hence, in this case, fourth and fifth images (process layers 3 and 4) serving as relatively small images compared to the images associated with the middle rectangle regions are associated with the lowermost rectangle regions.

These settings are done so as to detect only a small human body and detect no large human body in the upper portion of the image. Note that the correspondence between the size of each object frame and that of each of the first to N-th images is set in advance. This means that when the size of each object frame is determined, an image corresponding to this object frame can be specified from the first to N-th images.

However, a method of generating a correspondence table, as shown in FIG. 4, is not limited to this, and the user may generate this correspondence table by operating the input unit 103. For example, since no object is captured in the rectangle region having identification number (1, 1), a process layer need not always be associated with this rectangle region. The user may perform, for example, exception operations with regard to such association, using the input unit 103.

In this manner, the use of only process layers registered in the correspondence table during a detection process for each region in a human body detection process makes it possible to omit a human body detection process for an unnecessary size, thereby speeding up the human body detection process.

Various methods of associating the rectangle regions and the process layers with each other are available, and the following method is possible. For example, as process layers corresponding to a certain rectangle region, not only process layer 2 but also preceding and succeeding process layers (process layers 1 and 3) may be registered. Alternatively, not one set of preceding and succeeding process layers but a plurality of sets of preceding and succeeding process layers may be registered. In this case, a detection failure is more likely to occur as the reduction ratio of an image in a human body detection process comes closer to zero, so a relatively wide margin is desirably left in the process layers.

Also, a frame in each rectangle region may be obtained from, for example, one frame and two or more straight lines set by the user, instead of obtaining a frame in each rectangle region from two frames set by the user, as described above. In this case, a vanishing point in the image is obtained from a plurality of straight lines. Based on the vanishing point and the position of the set frame, a frame in each rectangle region is set to obtain a process layer corresponding to the size of the set frame. As a method of calculating a frame in each rectangle region, a frame in each rectangle region can be obtained in accordance with the proportionality relationship with the distance from a vanishing point upon simply defining the human body size at the vanishing point as zero.

Figure 13:
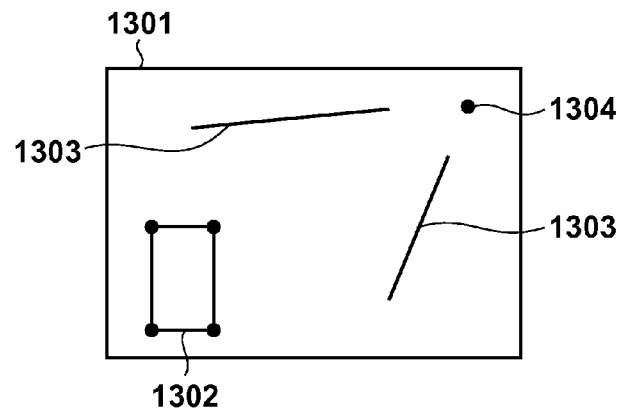
FIG. 13 is a view illustrating an example of how to set object frames.

In this case, in place of GUIs shown in FIGS. 5A and 5B, a GUI illustrated in FIG. 13 can be displayed to obtain a frame in each rectangle region using this GUI. Referring to FIG. 13, the user sets a frame 1302 and straight lines 1303 on a display screen 1301 of the display unit 109. The straight lines 1303 may be extracted by a straight line extraction process. A vanishing point 1304 is the intersection point between extensions of the two straight lines 1303.

Alternatively, a variety of image processing techniques of obtaining straight lines from an image obtained by, for example, Hough transformation are known, so two or more straight lines may automatically be obtained from the image using these techniques to obtain a vanishing point, thereby similarly obtaining a process layer at each position in the image. Although an example in which a vanishing point in the image is obtained from straight lines has been given herein, any method may be adopted as long as a vanishing point in the image can be obtained.

Figure 6:
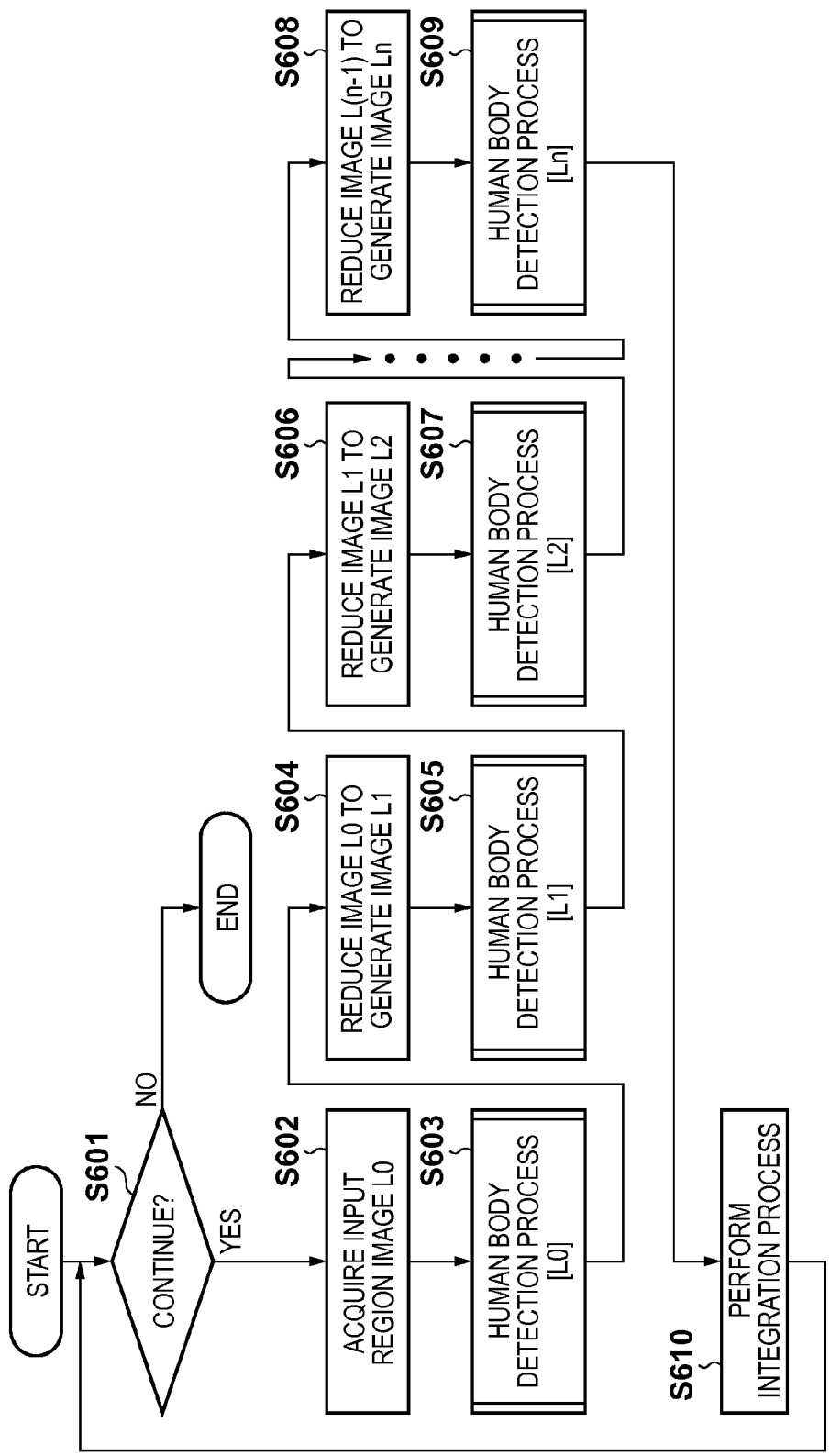
FIG. 6 is a flowchart of a process by the image processing apparatus in the first embodiment.

A process by the image processing apparatus according to this embodiment will be described with reference to a flowchart shown in FIG. 6. Note that a correspondence table as mentioned above has already been stored in the storage unit 105 at the start of the process according to the flowchart shown in FIG. 6.

In step S601, a control unit (not shown) of an image processing apparatus 100 determines whether the following process is to continue. As described above, if a specific time or more has elapsed from the start of the process in the flowchart shown in FIG. 6, the control unit determines in step S601 that the following process is to end; otherwise, it determines in step S601 that the following process is to continue. If YES is determined in step S601, the process advances to step S602; otherwise, the process ends. In step S602, the image acquisition unit 101 acquires an input image serving as a first image.

In step S603, the human body detection unit 102 performs a human body detection process for the first image acquired by the image acquisition unit 101 in step S601. Since all human body detection processes in steps S603, S605, S607, and S609 are performed in accordance with the same flowchart, a detailed description thereof will be given later for the sake of convenience.

After the process in step S603 ends, the human body detection unit 102 generates a second image by reducing the first image in step S604.

In step S605, the human body detection unit 102 performs a human body detection process for the second image generated in step S604. After the process in step S605 ends, the human body detection unit 102 generates a third image by reducing the second image in step S606.

In step S607, the human body detection unit 102 performs a human body detection process for the third image generated in step S606. Subsequently, the same process is performed for the fourth to N-th images (steps S608 & S609).

In step S610, the external output unit 106 integrates the results of the human body detection processes for the first to N-th images. In this integration process, regions in the first image, which correspond to human body detection regions in the first to N-th images, are obtained. The external output unit 106 outputs the positions and sizes of the obtained regions.

Figure 7:
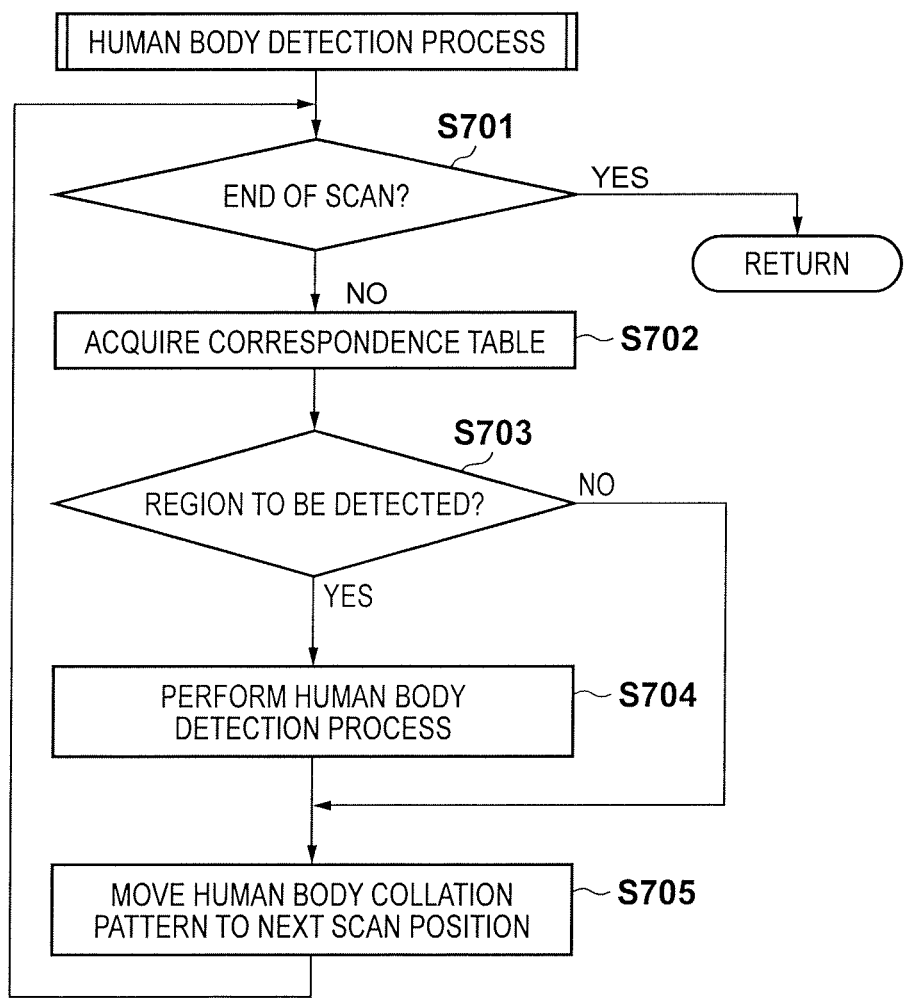
FIG. 7 is a flowchart for explaining a human body detection process in the first embodiment.

Human body detection processes in steps S603, S605, S607, and S609 will be described next with reference to a flowchart shown in FIG. 7. A human body detection process for the m-th image ($1 \leq m \leq N$) will be described below. Hence, it is only necessary to set m=1 in step S603, m=2 in step S605, m=3 in step S607, and m=N in step S609.

In step S701, the human body detection unit 102 determines whether the movement of the human body collation pattern in the m-th image is complete. That is, the human body detection unit 102 determines whether a human body detection process which uses the human body collation pattern in the m-th image is complete. If it is determined in step S701 that the movement of the human body collation pattern in the m-th image is complete, the process according to the flowchart shown in FIG. 7 ends. On the other hand, if it is determined in step S701 that the movement of the human body collation pattern in the m-th image is incomplete, that is, a human body detection process which uses the human body collation pattern in the m-th image is incomplete, the process advances to step S702. In step S702, the human body detection unit 102 acquires the above-mentioned correspondence table from the storage unit 105.

In step S703, the human body detection unit 102 looks up the correspondence table to determine whether the current human body collation pattern in the m-th image falls within a rectangle region having an identification number associated with the m-th image. If YES is determined in step S703, the process advances to step S704. On the other hand, if NO is determined in step S703, the process directly advances to step S705.

In the example shown in FIG. 4, when m=1, only if the human body collation pattern falls within the rectangle region having identification number (1, 2), (1, 3), or (1, 4), the process advances to step S704; otherwise, the process directly advances to step S705.

In step S704, the human body detection unit 102 performs a human body detection process by pattern matching between the human body collation pattern and the region overlapping it in the m-th image, and outputs the position at which a human body is detected, and the size of the detected human body.

In step S705, the human body detection unit 102 moves the human body collation pattern to the next position. Note that if the process advances from step S704 to step S705, the human body collation pattern need only be moved by several pixels in step S705. On the other hand, if the process advances from step S703 to step S705, the human body collation pattern may similarly be moved by several pixels, but it may still be the case that after movement in this amount, the position to which the human body collation pattern has moved does not yet fall within the rectangle region having the identification number associated with the m-th image. Hence, in such a case, the human body collation pattern may be moved to the next rectangle region. Upon such a process, human body detection processes in the same rectangle region can be collectively omitted.

With the above-mentioned operation, an image corresponding to a pattern having a first size can be detected from a first detection region in an acquired, first image. Also, an image corresponding to a pattern having a second size different from the first size can be detected from a second detection region in the acquired, first image.

As described above, according to this embodiment, an object detection process can be performed at a higher speed, regardless of the size of an object captured in the image.

Second Embodiment

Only features different from the first embodiment will be described below, and details are the same as in the first embodiment unless otherwise specified hereinafter. In the first embodiment, a human body detection process for a target layer is performed for the entire image. However, for example, a moving object detection process may be performed for an original image to perform a human body detection process only for a region in which a moving object is detected. Again in the first embodiment, a target layer is determined at the collation scan position at the time of a human body detection process and used. However, a target layer may be determined at the position of, for example, a moving object region and used.

Figure 8:
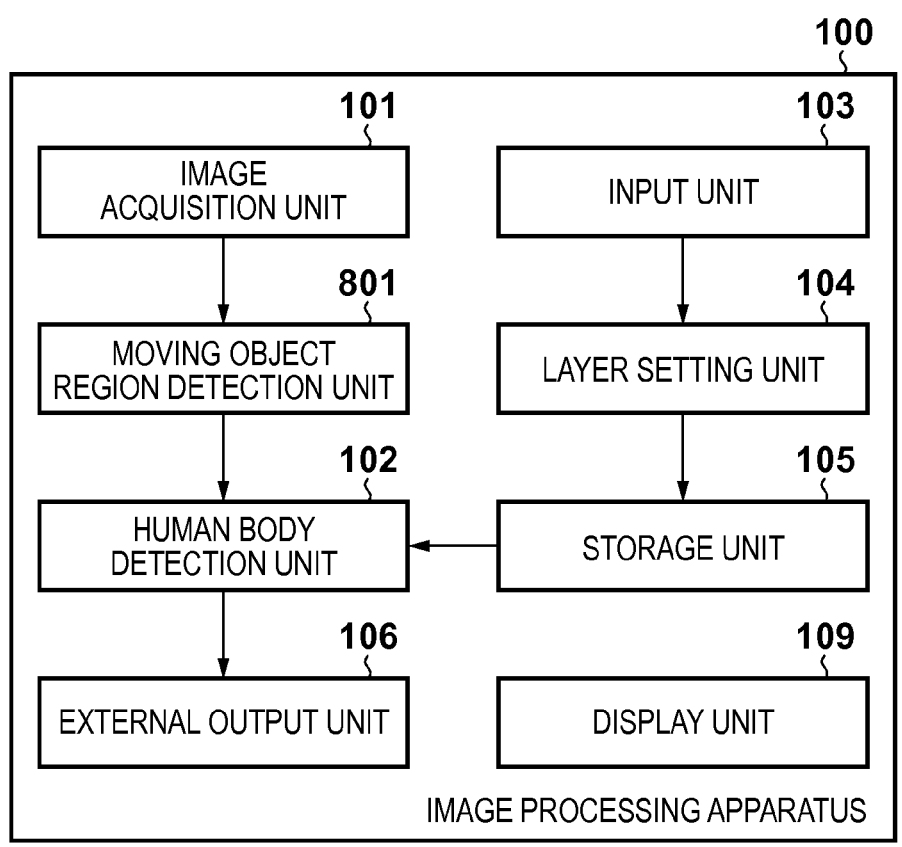
FIG. 8 is a block diagram illustrating an example of the functional configuration of an image processing apparatus in the second embodiment.

An example of the functional configuration of an image processing apparatus according to this embodiment will be described with reference to a block diagram shown in FIG. 8. Note that the same reference numerals as in FIG. 1 denote the same constituent elements in FIG. 8, and a description thereof will not be given.

A moving object region detection unit 801 detects a region, in which a moving object is captured, as a moving object region by the background difference method from a first image acquired by an image acquisition unit 101. The details to be detected are information (moving object region information) which specifies a moving object region in the first image, and includes, for example, the position of the moving object region in the first image, the circumscribed rectangle of the moving object region, and the size of the moving object region. Note that various techniques are applicable to a method of detecting a moving object region from the first image, not only the background difference method but also other techniques may be applied to this method.

The moving object region detection unit 801 sends the detected moving object region information to a human body detection unit 102 in the succeeding stage. The human body detection unit 102 determines as a target image region an image region, which is associated with the m-th image in advance and includes a moving object region indicated by the moving object region information, among respective image regions in the m-th image. The human body detection unit 102 then sets a rectangle region having a specific size at each position in the target image region to perform a human body detection process for the target image region.

Note that it is desired to perform a human body detection process not only for an image region including the entire moving object region but also for an image region partially including the moving object region. This is because human body detection can be performed even for a moving object region portion which is erroneously determined as "undetected" upon a moving object detection process.

Figure 9:
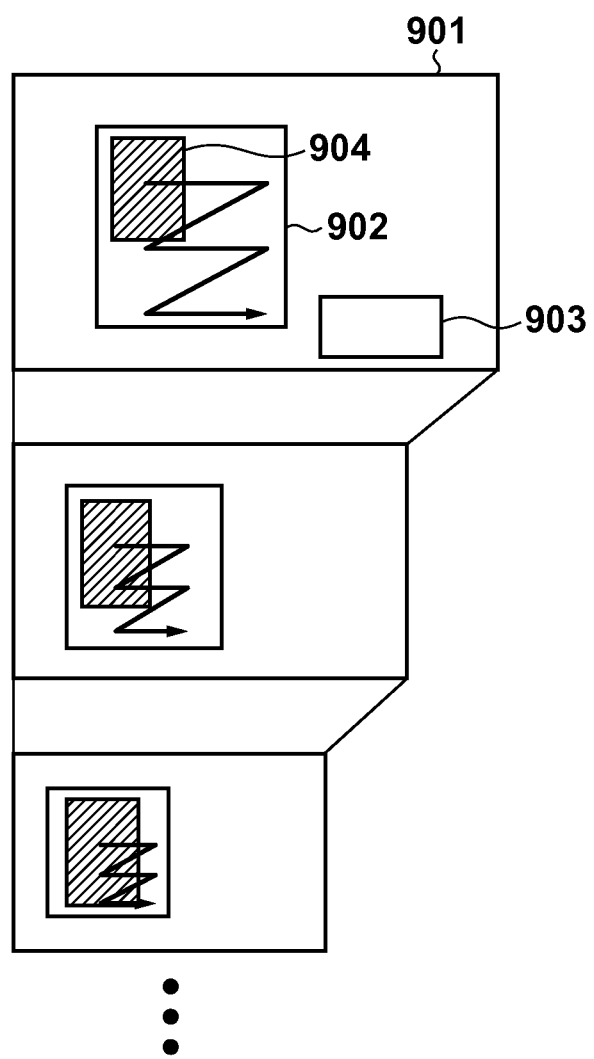
FIG. 9 is a view for explaining a pattern matching process in the second embodiment.

A human body detection process in this embodiment will be described with reference to FIG. 9. Upon defining as regions 902 and 903 as moving object regions obtained as the moving object region detection unit 801 performs a moving object detection process for an image 901 serving as a first image, the human body detection unit 102 performs a human body detection process in the regions 902 and 903 using a human body collation pattern 904. The human body detection unit 102 performs a human body detection process not for all image regions in the regions 902 and 903 but for image regions associated with the image 901, as a matter of course. The same process is also performed for the second image, third image, . . . , and N-th image.

Figure 10:
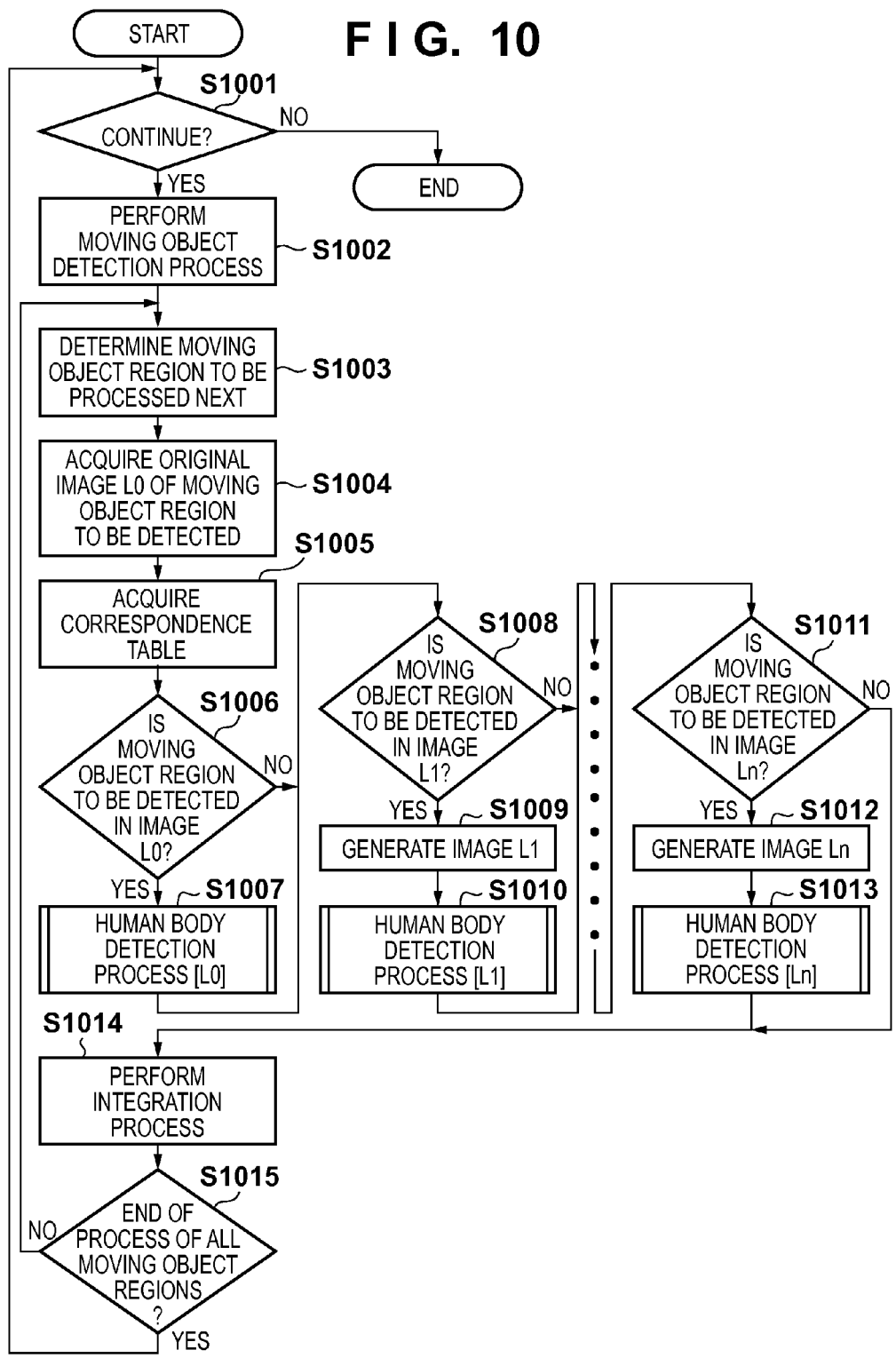
FIG. 10 is a flowchart of a process by the image processing apparatus in the second embodiment.

A process by the image processing apparatus according to this embodiment will be described with reference to FIG. 10.

In step S1001, a control unit (not shown) of an image processing apparatus 100 determines whether the following process is to continue, as in step S601 mentioned above. If YES is determined in step S1001, the process advances to step S1002; otherwise, the process ends. In step S1002, the image acquisition unit 101 acquires an input image serving as a first image, and the moving object region detection unit 801 detects a moving object region from the first image.

In step S1003, first, the human body detection unit 102 selects as a selected moving object region one moving object region, which has not yet undergone the following process, among the moving object regions detected in step S1002. Although the order of selection is not limited to a specific order, the moving object regions can be selected in, for example, the raster scan order from the position of the upper left corner in the first image.

In step S1004, the human body detection unit 102 extracts the selected moving object region from the first image as original image L0. In step S1005, the human body detection unit 102 specifies a process layer associated with the identification number of an image region including the selected moving object region from a correspondence table stored in a storage unit 105.

In step S1006, the human body detection unit 102 determines whether the process layer specified in step S1005 includes the first image. If YES is determined in step S1006, the process advances to step S1007; otherwise, the process directly advances to step S1008.

In step S1007, the human body detection unit 102 performs a human body detection process for original image L0. Since all human body detection processes in steps S1007, S1010, and S1013 are performed in accordance with the same flowchart, a detailed description thereof will be given later for the sake of convenience.

In step S1008, the human body detection unit 102 determines whether the process layer specified in step S1005 includes a second image. If YES is determined in step S1008, the process advances to step S1009; otherwise, processes corresponding to steps S1008 to S1010 are performed for the third image. In this way, the same process is performed for the fourth image, . . . , N-th image (steps S1011 to S1013).

In step S1009, the human body detection unit 102 generates a second image by reducing the first image. In step S1010, the human body detection unit 102 performs a human body detection process for a region corresponding to original image L0 in the second image generated in step S1009 (that is, a moving object region in the second image).

In step S1014, an external output unit 106 integrates the results of the human body detection processes for the first to N-th images. In this integration process, regions in the first image, which correspond to human body detection regions in the first to N-th images, are obtained. The external output unit 106 outputs the positions and sizes of the obtained regions.

In step S1015, the control unit (not shown) determines whether human body detection processes have been performed for all moving object regions detected in step S1002. If YES is determined in step S1015, the process returns to step S1001; otherwise, the process returns to step S1003.

Note that in this embodiment, it is determined in step S1008 or S1011 whether the process layer specified in step S1005 includes an m-th image, and the m-th image is generated. However, processes in steps S1009 and S1012 may be omitted by, for example, generating reduced images of layers to be processed itself in advance.

Figure 11:
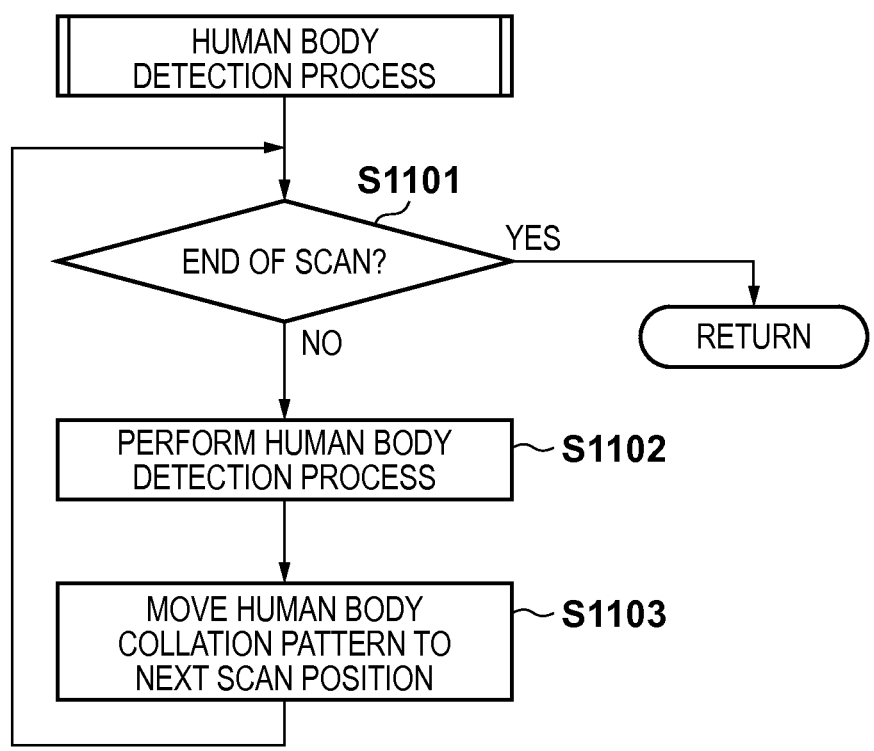
FIG. 11 is a flowchart for explaining a human body detection process in the second embodiment.

Human body detection processes in steps S1007, S1010, and S1013 will be described next with reference to a flowchart shown in FIG. 11. A human body detection process for the m-th image (1≤m≤N) will be described below. Hence, it is only necessary to set m=1 in step S1007, m=2 in step S1010, and m=N in step S1013.

In step S1101, the human body detection unit 102 determines whether the movement of the human body collation pattern within the selected moving object region in the m-th image is complete. That is, the human body detection unit 102 determines whether a human body detection process which uses the human body collation pattern within the selected moving object region in the m-th image is complete. If YES is determined in step S1101, the process according to the flowchart shown in FIG. 11 ends; otherwise, the process advances to step S1102.

In step S1102, the human body detection unit 102 performs a human body detection process by pattern matching between the human body collation pattern and the region overlapping it in the m-th image, and outputs the position at which a human body is detected, and the size of the detected human body.

In step S1103, the human body detection unit 102 moves the human body collation pattern to the next position. Note that in this operation, the human body collation pattern need only be moved by several pixels. The amount of movement is not limited to a specific amount of movement, as a matter of course.

As described above, according to this embodiment, a specific object detection process can be performed at high speed, regardless of the size of an object to be detected in the image. Also, a moving object detection process is performed for an original image to perform a human body detection process only for a region in which a moving object is detected, thereby performing human body detection at high speed.

Third Embodiment

Only features different from the first embodiment will be described below, and details are the same as in the first embodiment unless otherwise specified hereinafter. In the first embodiment, a correspondence table as illustrated in FIG. 4 is generated in advance and used in a human body detection process. However, a correspondence table may be generated based on, for example, the past human body detection results and used to perform human body detection.

In this embodiment, the following process is performed for a plurality of input images in advance. First to N-th images are generated from an input image first. Each of the first to N-th images is divided into a plurality of rectangle regions, as shown in FIG. 3, and a human body detection process is performed for each of these rectangle regions. The count value (initial value: 0) of a region in which a human body is detected is incremented by one.

Upon such a process, a correspondence table as shown in FIG. 12 is obtained. The count values of the rectangle regions having identification numbers (1, 1) to (3, 4) are registered in the correspondence table for each of first to N-th images L0 to Ln.

In the rectangle regions having identification number (1, 1) in the first, second, third, and fourth images, the number of times of detection of human bodies is five (count value: 5), four (count value: 4), three (count value: 3), and zero (count value: 0), respectively. Also, in the rectangle regions having identification number (3, 2) in the first, second, third, and fourth images, the number of times of detection of human bodies is zero (count value: 0), zero (count value: 0), one (count value: 1), and four (count value: 4), respectively.

In other words, the correspondence table indicates that relatively large human bodies are frequently detected in the upper portion of the image, and relatively small human bodies are frequently detected in the lower portion of the image. When such a correspondence table is generated, it is registered in a storage unit 105. The above-mentioned series of processes may be performed by operations input from an input unit 103 and the operation of the layer setting unit 104, or performed by an external apparatus.

In this embodiment as well, a human body detection process is performed in the same way as in the first embodiment, except for a process in step S703. Step S703 according to this embodiment will be described below.

In step S703, a human body detection unit 102 looks up the above-mentioned correspondence table to determine whether the m-th image corresponds to the maximum count value of the count values of the first to N-th images for the identification number of a rectangle region to which the current human body collation pattern in the m-th image belongs.

Step S703 will be described by giving an example herein. The human body collation pattern is assumed to be present in the rectangle region having identification number (2, 3) in the third image in step S703. The count values of the first to N-th images having identification number (2, 3) are 0, 3, 5, 0, . . . (the subsequent count values are all 0), so the count value of the third image is largest. In this case, therefore, the process advances to step S704. On the other hand, if the human body collation pattern is present in the rectangle region having identification number (2, 3) in the second image, so the count value of the third image is largest. In this case, therefore, the process advances to step S705.

Note that instead of determining the maximum count value, it may be determined whether the m-th image corresponds to a count value indicating a specific number of times or more (an image in which human bodies are detected a specific number of times or more). In this case, the specific number of times is desirably changed in accordance with the learning period (the period for which the above-mentioned plurality of input images are acquired). Alternatively, if images preceding and succeeding an image having a maximum count value are acquired, the process may advance to step S704 (images L1 and L2 serve as process layers for region R(2, 3)).

Again, evaluation information indicating a grade for the detection result for each divided region may be used, as will be described in the fifth embodiment. Evaluation information indicating a grade for the detection result for each divided region may be acquired in the learning period, and a region in which the grade for the detection result satisfies a predetermined condition may be set as a region in which object detection such as human body detection is to be detected. That is, it is determined whether each divided region obtained by dividing a first image into a plurality of regions is to be set as a detection region, in accordance with the grade for the detection result obtained by detecting an image corresponding to a pattern having the predetermined size within each divided region in the first image. Also, it is determined whether each divided region obtained by dividing a second image into a plurality of regions is to be set as a detection region, in accordance with the grade for the detection result obtained by detecting an image corresponding to a pattern having the predetermined size within each divided region in the second image.

Upon this operation, the first and second detection regions in the first image are set based on the detection result obtained by detecting an image corresponding to a first pattern or an image corresponding to a second pattern in each divided region obtained by dividing the first image into a plurality of regions.

As described above, according to this embodiment, a specific object detection process can be performed at high speed, regardless of the size of an object to be detected in the image. Also, a process layer to be used in a detection process can easily be set by performing the detection process based on the past detection results.

Also, the above-mentioned embodiments may be used in combination as needed. Moreover, some or all of the units of the image processing apparatus shown in FIG. 1 or 8, other than the input unit 103, storage unit 105, and display unit 109, may be implemented as hardware or software (computer program). In the latter case, the computer program is stored in a memory (not shown) in the image processing apparatus, and executed by a control unit such as a CPU of the image processing apparatus.

Fourth Embodiment

Figure 14:
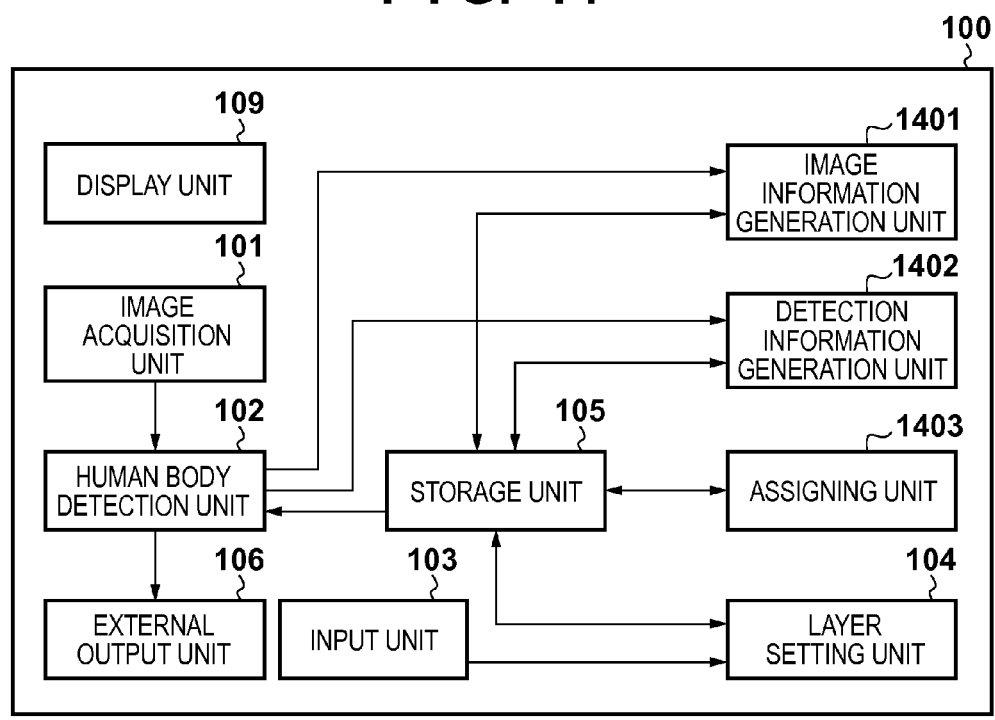
FIG. 14 is a block diagram illustrating an example of the functional configuration of an image processing apparatus in the fourth embodiment.

In this embodiment, a layer to undergo object detection is selected based on the result of executing a human body detection process using all layers of an input image in a learning period. FIG. 14 shows the configuration of an image processing apparatus according to this embodiment.

An image information generation unit 1401 generates image specifying information for specifying an image used in human body detection for the human body detection result obtained by a human body detection unit 102, and stores it in a storage unit 105. A detection information generation unit 1402 generates detection position specifying information for specifying the detection position in human body detection for the human body detection result obtained by the human body detection unit 102, and stores it in the storage unit 105.

An assigning unit 1403 assigns evaluation information indicating a grade for the detection result, based on the image specifying information generated by the image information generation unit 1401, and the detection position specifying information generated by the detection information generation unit 1402. A layer setting unit 104 generates a correspondence table which associates a predetermined region in an image with a process layer, based on the evaluation information assigned by the assigning unit 1403. The process layer means information indicating a layer to be used in human body detection by the human body detection unit 102.

The storage unit 105 stores the image specifying information generated by the image information generation unit 1401, the detection position specifying information generated by the detection information generation unit 1402, and the correspondence table generated by the layer setting unit 104. The human body detection unit 102 performs a human body detection process based on the setting values of the stored correspondence table. The storage unit 105 also stores a human body collation pattern to be used in a human body detection process. An external output unit 106 outputs various types of information processed by an image processing apparatus 100 to an external apparatus. Other configurations are the same as those described with reference to FIG. 1 in the first embodiment, and a description thereof will not be given.

The image specifying information will be described next. The image specifying information means information for specifying an image (layer) used in human body detection for the human body detection result obtained by the human body detection unit 102. Information indicating an image itself used in human body detection, for example, is used as image specifying information. Also, frame identifier information of an image used in human body detection, or time information in human body detection may be used as image specifying information. In this case, a still image or moving image externally acquired by the image acquisition unit 101 must be recorded in the storage unit 105 or an external storage unit, together with the frame identifier information or time information, so that the image used in human body detection can be specified later.

The detection position specifying information will be described next. The detection position specifying information means information for specifying the detection position in human body detection for the human body detection result obtained by the human body detection unit 102. Coordinate information indicating the position at which the human body detection unit 102 has detected a human body, for example, is used as detection position specifying information. The coordinates obtained at this time may be represented using a coordinate system in a reduced image, or a coordinate system in layer 0 after the detection position in a reduced image is converted into that in an image (original image) of layer 0 corresponding to the reduced image. Also, image information obtained by superimposing information, indicating the position at which a human body is detected, on an image included in the image specifying information may be used as detection position specifying information.

In this embodiment, upon defining a predetermined period as a learning period, a human body detection process is executed using all layers of an input image within the learning period. Based on the detection result, the image information generation unit 1401 generates image specifying information, and the detection information generation unit 1402 generates detection position specifying information. Note that the detection result may be acquired using a method other than the method which defines a predetermined period as a learning period. The detection result may be acquired by defining, for example, the period, for which human body detection has been performed a predetermined number of times, as a learning period. Alternatively, a detection result prepared in advance may be directly used.

Figure 15:
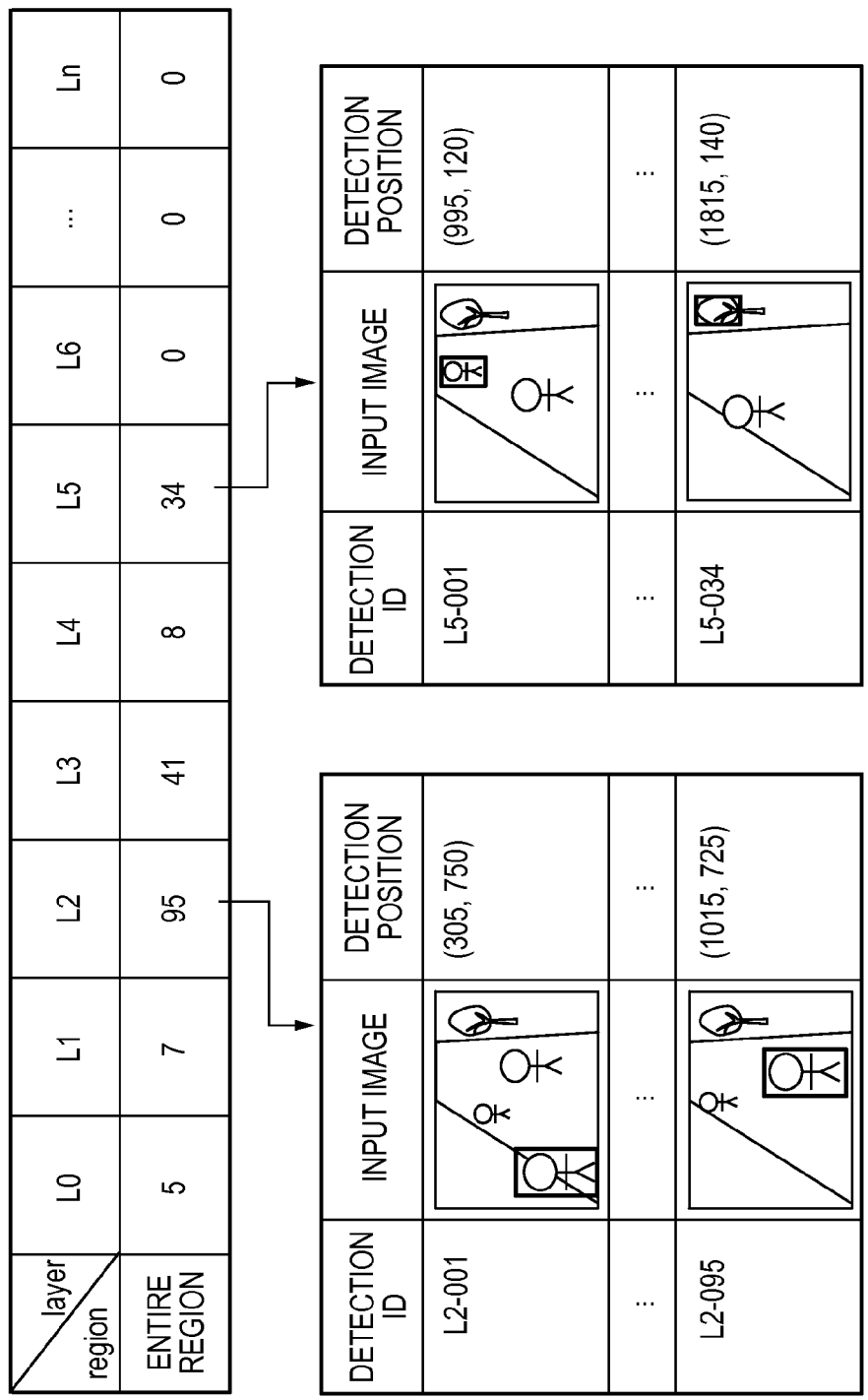
FIG. 15 is a table illustrating an example of a recording table in the fourth embodiment.

FIG. 15 is a recording table illustrating an example of how to hold the image specifying information and detection position specifying information. The recording table records the number of human body detection events occurred in each layer. The human body detection event means herein detection of one human body detection operation in an arbitrary layer. As can be seen from the example shown in FIG. 15, 95 human body detection events have occurred in layer L2 within the learning period. As can also be seen from the example shown in FIG. 15, 34 human body detection events have occurred in layer L5 within the learning period. In the recording table, unique IDs are assigned to respective detection events (for example, L2-001, . . . , L2-095, L5-001, . . . , L5-034), and image specifying information and detection position specifying information corresponding to these events are recorded in association with these IDs.

The recording table is stored in the storage unit 105. Note that a method of holding image specifying information and detection position specifying information is not limited to the above-mentioned method, and an arbitrary method which can extract image specifying information and detection position specifying information corresponding to a detection event in each layer may be used.

Figure 16:
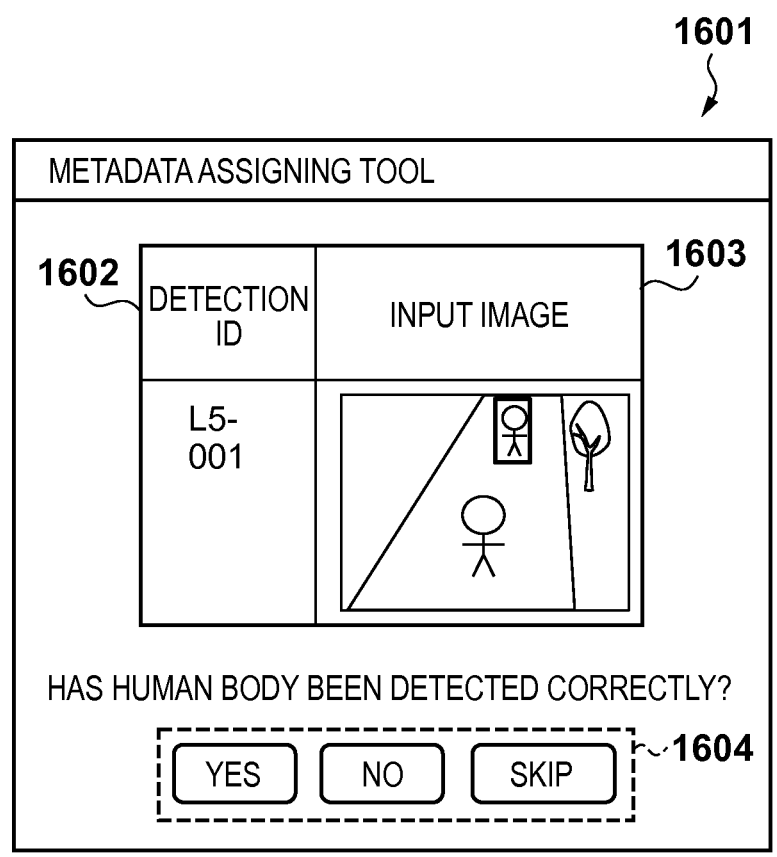
FIG. 16 is a view illustrating an example of how to assign evaluation information in the fourth embodiment.

Evaluation information assignment will be described next. The evaluation information assignment means assigning evaluation information to the past human body detection events recorded in the recording table. The evaluation information is stored in the storage unit 105 in association with the recording table. FIG. 16 shows a user interface 1601 which functions as the assigning unit 1403. The user interface 1601 sequentially presents to the user image specifying information and detection position specifying information corresponding to the past human body detection events, which are recorded in the recording table. The user interface 1601 presents to the user an ID 1602 of a human body detection event, and an input image 1603 obtained by superimposing a rectangle, indicating the human body detection position acquired using the detection position specifying information, on an input image acquired using the image specifying information. The size of the rectangle is determined based on the number of a layer used in human body detection, and the size of a collation pattern to be used in a pattern matching process.

The user evaluates based on the presented information whether the human body detection result is correct or incorrect, and assigns the evaluation result using a button group 1604. In the example shown in FIG. 16, if the user determines that a human body has correctly been detected, he or she selects "Yes"; otherwise, he or she selects "No". However, if the user cannot determine whether a human body has correctly been detected or wants to skip this determination process, he or she selects "Skip". Correctness determination information which indicates whether human body detection is correct or incorrect, and is assigned in this case illustrates an example of the evaluation information. In this way, evaluation information from the user is accepted.

Evaluation information assigned by the assigning unit 1403 is not limited to the above-mentioned information. Evaluation information indicating whether the object of interest requires detection, for example, may be assigned. Also, detailed information including, for example, the orientation or type of detected human body may be assigned as evaluation information. The type of detected object includes herein the properties of the detected object, such as the distinction between a male and a female and that between a child and adult. Also, if detection of a specific object is incorrect, the cause information of this incorrect detection may be assigned as evaluation information.

A method of assigning evaluation information is not particularly limited, either. For example, human body detection is performed again for an input image recorded in the recording table, using a human body recognition engine (second detection unit) which has a detection accuracy higher than the human body detection unit 102 but a calculation cost higher than the human body detection unit 102. Assuming the human body detection result as correct answer data, evaluation information associated with correctness determination for detection may automatically be assigned to each detection event. In this way, the second detection unit evaluates the detection result obtained by detecting an image corresponding to a pattern having a predetermined size from an input image.

Figure 17:
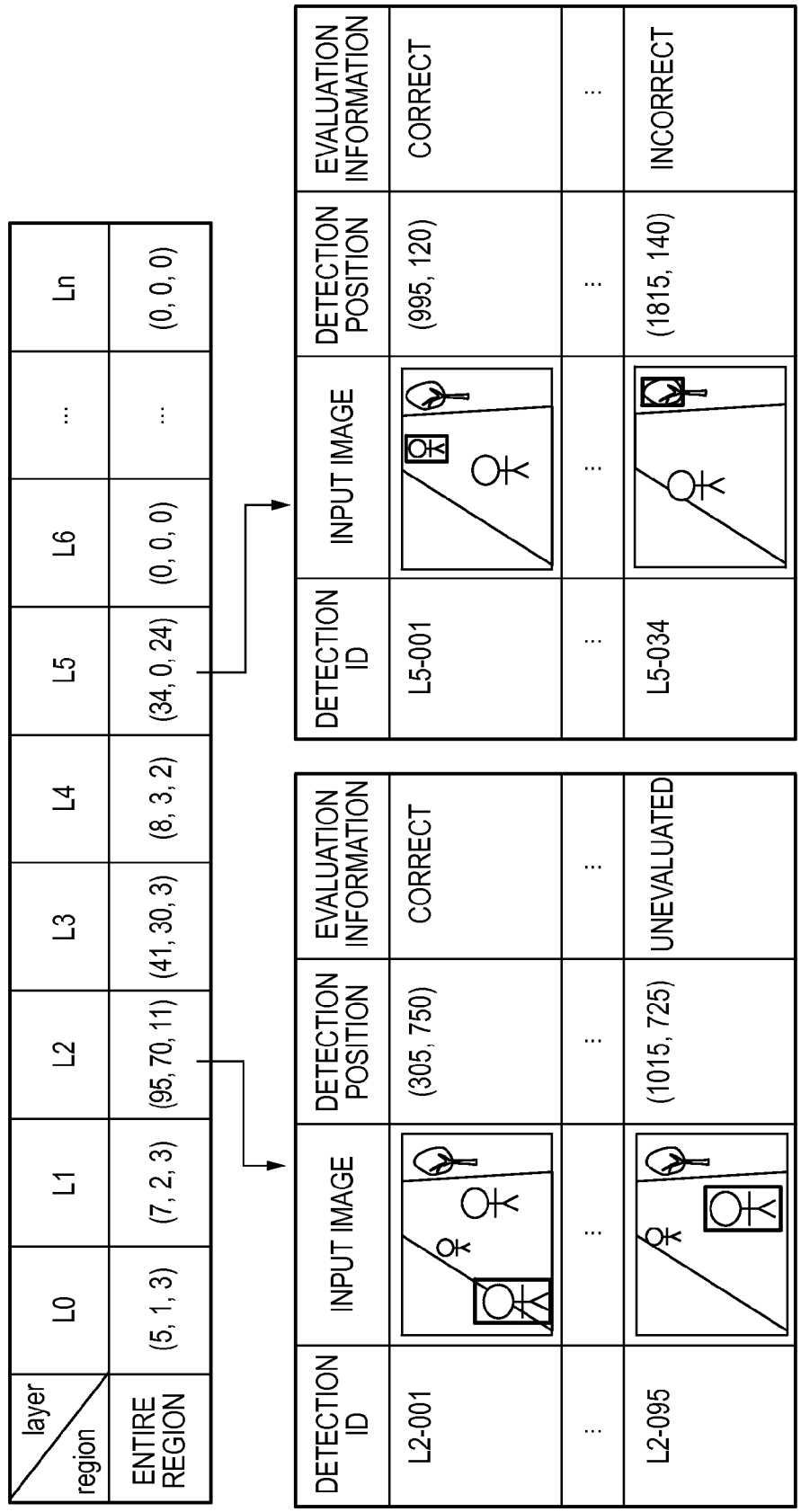
FIG. 17 is a table illustrating an example of a recording table assigned with the evaluation information in the fourth embodiment.

FIG. 17 is a recording table obtained by adding evaluation information to the recording table shown in FIG. 15. In this example, information indicating whether the detection result is correct or incorrect is assigned to each detection event as evaluation information. FIG. 17 represents a correct detection result as "Correct", an incorrect detection result as "Incorrect", and a detection result determined as neither "Correct" nor "Incorrect" as "Unevaluated".

Note that a method of holding evaluation information is not limited to the above-mentioned method, and an arbitrary method which can extract evaluation information corresponding to a detection event in each layer may be used.

Also, referring to FIG. 17, the statistics of the evaluation information in each layer are recorded in the form of (n, p, f). n is the number of human body detection events occurred in each layer, like the number of times of detection shown in FIG. 15. p is the number of human body detection events assigned with evaluation information "Correct" among the n human body detection events. f is the number of human body detection events assigned with evaluation information "Incorrect" among the n human body detection events. The number of times of detection obtained by subtracting f from n will be referred to as the effective number of times of detection hereinafter. However, the effective number of times of detection may be calculated using an arbitrary method, and p, for example, may be used.

A correspondence table will be described next. More specifically, a method of generating a correspondence table from a recording table assigned with evaluation information will be described. The correspondence table records each layer to undergo a human body detection process. A correspondence table is generated using one of, for example, the following methods.

A correspondence table which defines, as a layer to undergo a human body detection process, a layer having a largest effective number of times of detection is generated.

A correspondence table which defines, as layers to undergo a human body detection process, several layers preceding and succeeding a layer having a largest effective number of times of detection is generated.

A correspondence table which defines, as a layer to undergo human body detection, a layer having an effective number of times of detection or an effective number of times of detection per unit time, which is equal to or larger than a threshold, is generated.

A correspondence table which defines, as a layer to undergo human body detection, a layer having a number of times of incorrect detection or a number of times of incorrect detection per unit time, which is equal to or smaller than a threshold, is generated.

However, a method of generating a correspondence table may be arbitrary, and is not limited to these methods.

Figure 18:
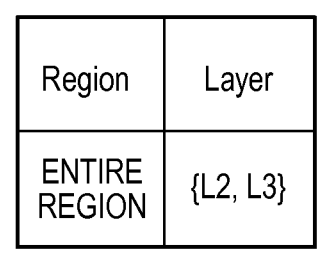

FIG. 18 illustrates an example of a correspondence table generated based on the recording table shown in FIG. 17. In this example, upon defining the effective number of times of detection as n−f, a correspondence table is generated from a layer having a value n−f of 30 or more. The correspondence table shown in FIG. 18 shows that human body detection is performed using layers 2 and 3 in the entire region of an input image. The correspondence table is stored in the storage unit 105.

A method of generating a correspondence table when information indicating whether the detection result is correct or incorrect is used as evaluation information has been described above. Similarly, a correspondence table can also be generated using an arbitrary method when details such as the orientation or type of detected object, or the cause information of incorrect detection is used as evaluation information. A correspondence table may be generated based on, for example, only a layer having a number of times of detection of males who hold their heads sideways, which is equal to or larger than a threshold.

The procedure of the overall process by the human body detection unit 102 will be described next with reference to a flowchart shown in FIG. 19.

In step S1901, the human body detection unit 102 determines whether the process is to continue. If YES is determined in step S1901, the process advances to step S1902. On the other hand, if NO is determined in step S1901, the process ends.

In step S1902, the human body detection unit 102 acquires the correspondence table shown in FIG. 18 from the storage unit 105. In step S1903, the human body detection unit 102 acquires an image of layer 0 (L0) externally acquired by the image acquisition unit 101.

In step S1904, the human body detection unit 102 looks up the correspondence table to determine whether layer 0 requires human body detection. If YES is determined in step S1904, the process advances to step S1905. On the other hand, if NO is determined in step S1904, the process directly advances to step S1906. In step S1905, the human body detection unit 102 performs a human body detection process for the entire region of layer 0.

Steps S1906 to S1909 form a loop process for performing human body detection for each of layers 1 to N. Initially, n=1 is set, and n is incremented by one every time the loop process is repeated. After a process when n=N is completed, the loop process ends, and the process advances to step S1910.

In step S1906, the human body detection unit 102 looks up the correspondence table to determine whether layer n and subsequent layers include at least one layer which requires human body detection. If YES is determined in step S1906, the process advances to step S1907. On the other hand, if NO is determined in step S1906, the process escapes from the loop and advances to step S1910. When, for example, n=1 and the correspondence table is {L2, L3}, YES is determined in step S1906, and the process advances to step S1907.

In step S1907, the human body detection unit 102 reduces layer n−1 to generate layer n. In step S1908, the human body detection unit 102 looks up the correspondence table to determine whether layer n requires human body detection. If YES is determined in step S1908, the process advances to step S1909. On the other hand, if NO is determined in step S1908, the process skips step S1909 and enters the next loop. When, for example, n=1 and the correspondence table is {L2, L3}, NO is determined in step S1908, and the process skips step S1909, enters the next loop, and advances to step S1906.

In step S1909, the human body detection unit 102 performs a human body detection process for the entire region of layer n. In step S1910, the human body detection unit 102 performs an integration process of the human body detection results obtained for respective layers. In the integration process, the position and size of a human body in the human body detection result obtained for each layer are converted into those of the human body in the original image. The process then returns to step S1901. Upon the above-mentioned operation, a series of processes in the flowchart shown in FIG. 19 ends.

Figure 19:
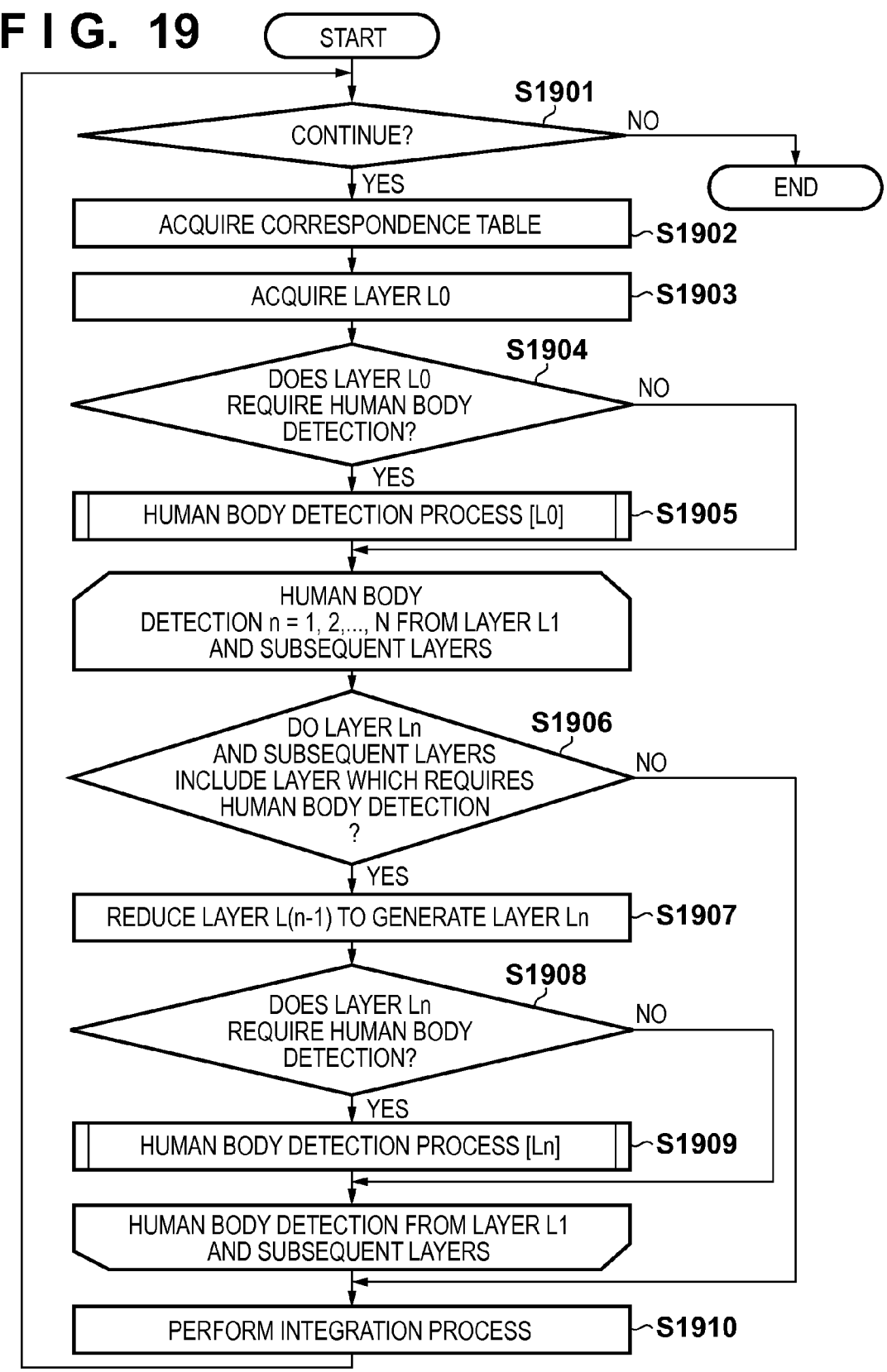
FIG. 19 is a flowchart of a process by the image processing apparatus in the fourth embodiment.

Processes in steps S1905 and S1909 as human body detection process subroutines for one layer in FIG. 19 are the same as in the processes described with reference to FIG. 11, and a description thereof will not be given.

As described above, according to this embodiment, even if incorrect detection occurs in a detection process for a specific object, the priority level of each layer used in pattern matching is appropriately determined, thereby detecting a specific object at high speed.

Fifth Embodiment

In the fifth embodiment, an input image is divided into a plurality of regions, and a correspondence table is set separately for each region. The configuration and other process procedures of an image processing apparatus are the same as in the fourth embodiment. The same parts as in the fourth embodiment will not be described hereinafter, and only differences from the fourth embodiment will be described hereinafter.

FIG. 20 illustrates an example of a recording table according to the fifth embodiment. In the recording table shown in FIG. 20, image specifying information, detection position specifying information, and evaluation information are recorded for each of a plurality of image regions obtained by dividing one image. An image divided into a plurality of regions, as shown in FIG. 3, will be taken as an example. For example, the statistics of evaluation information of image L0 are (n, p, f)=(5, 3, 1) for region R(1, 1) indicated by ID(1, 1) in the image shown in FIG. 3. However, detailed information of each detection event, which includes, for example, image specifying information and detection position specifying information, is not illustrated in FIG. 20, and are the same as in FIGS. 15 and 17.

FIG. 21 illustrates an example of a correspondence table according to the fifth embodiment. In this embodiment, a correspondence table is obtained for each region on the screen using a layer setting unit 104. In this example, human body detection is performed for none of layers in region R(1, 1). Also, human body detection is performed for layers 0 and 1 in regions R(1, 2) to R(1, 4). Human body detection is performed for layers 1 and 2 in regions R(2, 1) to R(2, 4). Human body detection is performed for layers 3 and 4 in regions R(3, 1) to R(3, 4).

The procedure of the overall process by a human body detection unit 102 will be described next with reference to a flowchart shown in FIG. 22. Of processes shown in FIG. 22, processes in steps S2201, S2203, S2207, and S2210 are the same as processes in steps S1901, S1903, S1907, and S1910 in FIG. 19, respectively, and a description thereof will not be given. In step S2202, the human body detection unit 102 acquires the correspondence table shown in FIG. 21 from a storage unit 105.

In step S2204, the human body detection unit 102 looks up the correspondence table shown in FIG. 21 to determine whether layer 0 includes at least one region to undergo a human body detection process. If YES is determined in step S2204, the process advances to step S2205. On the other hand, if NO is determined in step S2204, the process advances to step S2206.

In step S2205, the human body detection unit 102 performs a human body detection process for layer 0. In step S2206, the human body detection unit 102 looks up the correspondence table to determine whether layer n and subsequent layers include at least one region which requires a human body detection process. If YES is determined in step S2206, the process advances to step S2207. On the other hand, if NO is determined in step S2206, the process escapes from the loop and advances to step S2210.

In step S2208, the human body detection unit 102 looks up the correspondence table to determine whether layer n includes at least one region which requires a human body detection process. If YES is determined in step S2208, the process advances to step S2209. On the other hand, if NO is determined in step S2209, the process skips step S2209 and enters the next loop. In step S2209, the human body detection unit 102 performs a human body detection process for the region which requires a human body detection process in layer n. Upon the above-mentioned operation, a series of processes in the flowchart shown in FIG. 22 ends.

Figure 22:
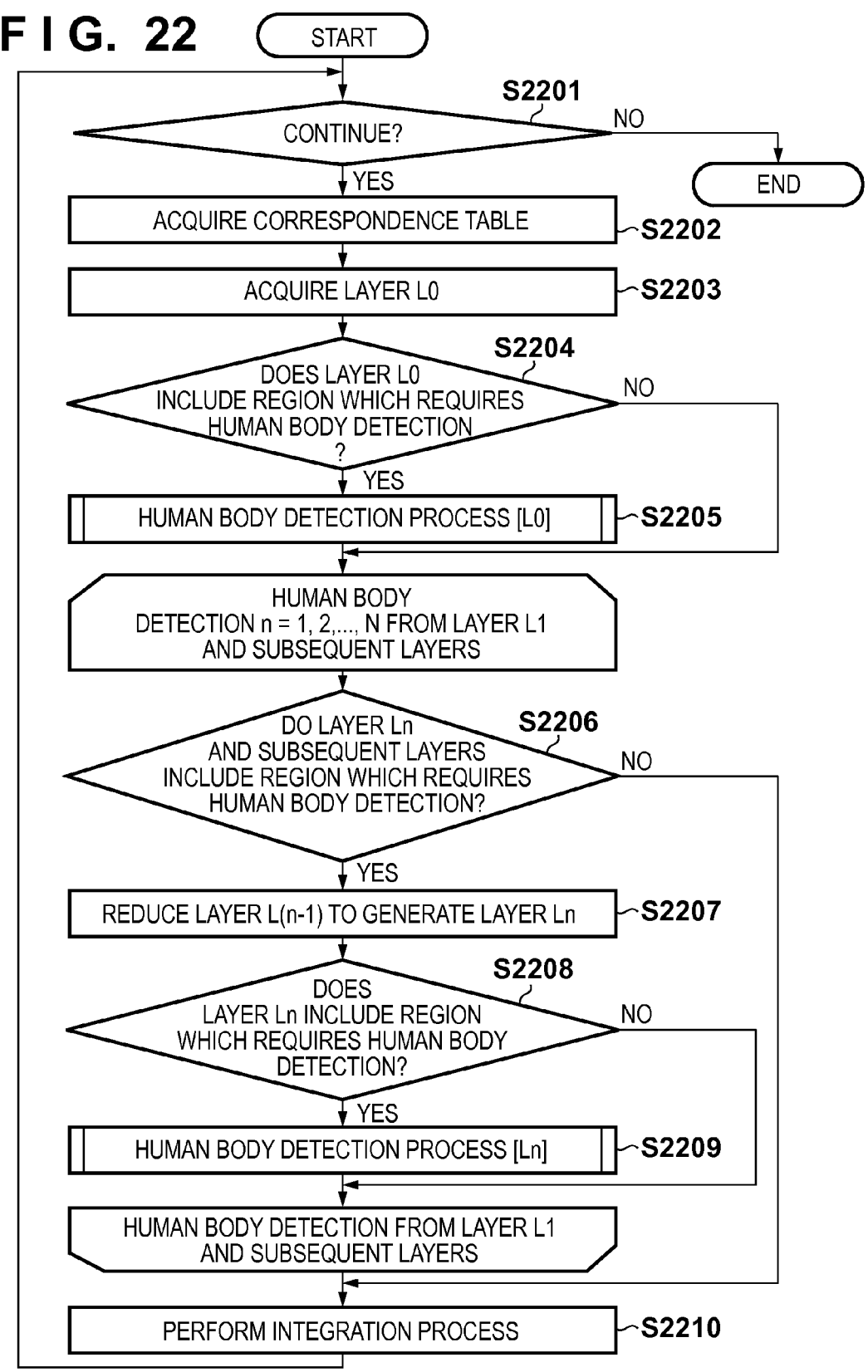
FIG. 22 is a flowchart of a process by an image processing apparatus according to the fifth embodiment.

Processes in steps S2205 and S2209 as human body detection process subroutines for one layer in FIG. 22 are the same as in the processes described with reference to FIG. 7, and a description thereof will not be given. However, in this embodiment, a correspondence table is acquired in step S2202 of the process shown in FIG. 22, the process in step S702 of FIG. 7 need not be performed.

As described above, according to this embodiment, the screen is divided into a plurality of regions, and the priority level of each layer used in pattern matching is appropriately determined for each region, thereby detecting a specific object at high speed.

According to the present invention, evaluation information is assigned to a detection recording table which holds the detection result obtained by a specific object detection unit for each process layer in a predetermined period of the past to eliminate any incorrect detection results, thereby allowing the user to appropriately select a layer to undergo object detection. Hence, even if specific objects are frequently, incorrectly detected in a video image obtained by, for example, a monitoring camera, an object detection process can be performed at high speed. Also, the above-mentioned embodiments may be used in combination as needed.

In the first to fifth embodiments, an image which matches a pattern having a predetermined size is detected from a plurality of images generated by changing the size of an acquired image, thereby detecting objects having different sizes. However, a detection method is not limited to this. Object detection may be performed for one screen using patterns having different sizes, thereby detecting objects having different sizes. Such a detection method can also be used to practice the invention according to each of the first to fifth embodiments. That is, an image corresponding to a pattern having a first size is detected from a first detection region in an acquired image. Then, an image corresponding to a pattern having a second size different from the first size is detected from a second detection region different from the first detection region in the acquired image. This obviates the need for pattern matching using all patterns on the entire screen, thereby making it possible to improve the detection process speed. It is also possible to reduce the process load for detection.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-199935 filed Sep. 13, 2011 and No. 2012-053683 filed Mar. 9, 2012 which are hereby incorporated by reference herein in their entirety.

What is claimed is:

1. An image processing apparatus comprising:
an acquisition unit which acquires a first image and a second image;
an image detection unit which detects an image corresponding to a pattern having a first size from a first detection region in the first image acquired by said acquisition unit and from a second detection region different from the first detection region in the first image; and
a determination unit which determines whether or not to detect an image corresponding to the pattern having the first size from the first detection region in the second image acquired by said acquisition unit and whether or not to detect an image corresponding to the pattern having the first size from the second detection region in the second image, in accordance with detection results of detecting an image corresponding to the pattern having the first size from the first detection region in the first image and from the second detection region in the first image.

2. The apparatus according to claim 1, further comprising:
a generation unit which changes a size of the first image to generate a third image,
wherein said image detection unit detects an image corresponding to the pattern having the first size from the first detection region in the first image, and detects an image corresponding to the pattern having the first size from the second detection region in the third image.

3. The apparatus according to claim 1, further comprising:
a moving object detection unit which detects a moving object from a video image,
wherein
said acquisition unit acquires the first image and the second image from the video image,
said moving object detection unit detects a moving object region in which the moving object exists in the first image acquired by said acquisition unit, and
said image detection unit detects an image corresponding to the pattern having the first size from the moving object region in the first detection region in the first image, and detects an image corresponding to the pattern having the first size from the moving object region in the second detection region in the first image.

4. The apparatus according to claim 1,
wherein
said image detection unit detects an image corresponding to the pattern having the first size from a plurality of regions in the first image, and
said determination unit selects, from the plurality of regions in the first image, the first detection region and the second detection region from which an image corresponding to the pattern having the first size is to be detected, in accordance with detection results obtained by detecting an image corresponding to the pattern having the first size from the plurality of regions in the first image.

5. The apparatus according to claim 1,
wherein
said acquisition unit acquires a plurality of images including the first image and excluding the second image,
said image detection unit detects an image corresponding to the pattern having the first size from the first detection region in the plurality of images acquired by the acquisition unit and from the second detection region in the plurality of images, and
said determination unit determines whether or not to detect an image corresponding to the pattern having the first size from the first detection region in the second image acquired by said acquisition unit and whether or not to detect an image corresponding to the pattern having the first size from the second detection region in the second image, in accordance with the number of times of detection of images corresponding to the pattern having the first size from the first detection region in the plurality of images and from the second detection region in the plurality of images.

6. The apparatus according to claim 1, further comprising:
a storage unit which stores evaluation information indicating a grade for the detection result obtained by said image detection unit,
wherein the determination unit determines whether or not to detect an image corresponding to the pattern having the first size from the first detection region in the second image and whether or not to detect an image corresponding to the pattern having the first size from the second detection region in the second image, in accordance with the evaluation information indicating the grade for the detection results obtained by detecting the image corresponding to the pattern having the first size from the first detection region in the first image and from the second detection region in the first image by said image detection unit.

7. The apparatus according to claim 2, further comprising:
a storage unit which stores evaluation information indicating a grade for the detection result obtained by said image detection unit,
wherein said generation unit changes a size of the second image to generate a fourth image, and
wherein said determination unit determines whether or not to detect an image corresponding to the pattern having the first size from the first detection region in the fourth image and whether or not to detect an image corresponding to the pattern having the first size from the second detection region in the fourth image, in accordance with the evaluation information indicating the grade for the detection result obtained by detecting the image corresponding to the pattern having the first size from the first detection region in the third image and from the second detection region in the third image by said image detection unit.

8. The apparatus according to claim 6, further comprising:
an output unit which outputs the detection result obtained by detecting the image by said image detection unit; and
an input unit which inputs evaluation information indicating a grade for the detection result output from said output unit,
wherein said storage unit stores the evaluation information inputted by said input unit.

9. The apparatus according to claim 6, further comprising:
an evaluation unit which evaluates the detection result obtained by detecting the image by said image detection unit,
wherein said storage unit stores the evaluation information corresponding to the evaluation result obtained by said evaluation unit.

10. The apparatus according to claim 6, wherein the evaluation information includes at least one of information indicating whether the image detected by said image detection unit is a desired image, and a type of the image detected by said image detection unit.

11. An image processing method comprising:
an acquisition step of acquiring a first image and a second image;
an image detection step of detecting an image corresponding to a pattern having a first size from a first detection region in the first image acquired in the acquisition step and from a second detection region different from the first detection region in the first image; and
a determination step of determining whether or not to detect an image corresponding to the pattern having the first size from the first detection region in the second image acquired in the acquisition step and whether or not to detect an image corresponding to the pattern having the first size from the second detection region in the second image, in accordance with detection results of detecting an image corresponding to the pattern having the first size from the first detection region in the first image and from the second detection region in the first image.

12. The method according to claim 11, further comprising:
a generation step of changing a size of the first image to generate a third image,
wherein in the image detection step, an image corresponding to the pattern having the first size is detected from the first detection region in the first image, and an image corresponding to the pattern having the first size is detected from a second detection region in the third image.

13. The method according to claim 11, further comprising:
a storage step of storing evaluation information indicating a grade for the detection result obtained in the image detection step,
wherein the determination step determines whether an image corresponding to the pattern having the first size is to be detected from the first detection region in the second image or not and whether an image corresponding to the pattern having the first size is to be detected from the second detection region in the second image or not, in accordance with the evaluation information indicating the grade for the detection results obtained by detecting the image corresponding to the pattern having the first size from the first detection region in the first image and from the second detection region in the first image in the image detection step.

14. The method according to claim 12, further comprising:
a storage step of storing evaluation information indicating a grade for the detection result obtained in the image detection step,
wherein said generation step changes a size of the second image to generate a fourth image, and
wherein said determination step determines whether an image corresponding to the pattern having the first size from is to be detected from the first detection region in the fourth image or not and whether an image corresponding to the pattern having the first size from is to be detected from the second detection region in the fourth image or not, in accordance with the evaluation information indicating the grade for the detection results obtained by detecting the image corresponding to the pattern having the first size from the first detection region in the third image from the second detection region in the third image in the image detection step.

15. A non-transitory recording medium recording a program to be executed by a computer, the program comprising:
an acquisition step of acquiring first image and a second image;
an image detection step of detecting an image corresponding to a pattern having a first size from a first detection region in the first image acquired in the acquisition step and from a second detection region different from the first detection region in the first image; and
a determination step of determining whether or not to detect an image corresponding to the pattern having the first size from the first detection region in the second image acquired in the acquisition step and whether or not to detect an image corresponding to the pattern having the first size from the second detection region in the second image, in accordance with detection results of detecting an image corresponding to the pattern having the first size from the first detection region in the first image and from the second detection region in the first image.

16. The medium according to claim 15, the program further comprising:
a generation step of changing a size of the first image to generate a third image,
wherein in the image detection step, an image corresponding to the pattern having the first size is detected from the first detection region in the first image, and an image corresponding to the pattern having the first size is detected from a second detection region in the third image.

17. The apparatus according to claim 1, wherein said image detection unit detects an image corresponding to a pattern having a second size from the first detection region in the first image acquired by said acquisition unit and from the second detection region in the first image, and
said determination unit determines whether or not to detect an image corresponding to the pattern having the second size from the first detection region in the second image and whether or not to detect an image corresponding to the pattern having the second size from the second detection region in the second image, in accordance with detection results of detecting an image corresponding to the pattern having the second size from the first detection region in the first image and from the second detection region in the first image.

18. The method according to claim 11, wherein the image detection step detects an image corresponding to a pattern having a second size from the first detection region in the first image acquired in the acquisition step and from the second detection region in the first image, and
the determination step determines whether an image corresponding to the pattern having the second size is to be detected from the first detection region in the second image or not and whether an image corresponding to the pattern having the second size is to be detected from the second detection region in the second image or not, in accordance with results of detecting an image corresponding to the pattern having the second size from the first detection region in the first image and from the second detection region in the first image.

19. The medium according to claim 15, wherein the image detection step detects an image corresponding to a pattern having a second size from the first detection region in the first image acquired in the acquisition step and from the second detection region in the first image, and
the determination step determines whether an image corresponding to the pattern having the second size is to be detected from the first detection region in the second image or not and whether an image corresponding to the pattern having the second size is to be detected from the second detection region in the second image or not in accordance with results of the detecting an image corresponding to the pattern having the second size from the first detection region in the first image and from the second detection region in the first image.

20. An image processing apparatus comprising:
an acquisition unit which acquires a first image and a second image;
an image detection unit which detects an image corresponding to a pattern having a first size from the first image acquired by said acquisition unit and an image corresponding to a pattern having a second size from the first image; and
a determination unit which determines whether or not to detect an image corresponding to the pattern having the first size from the second image acquired by said acquisition unit and whether or not to detect an image corresponding to the pattern having the second size from the second image, in accordance with detection results of detecting an image corresponding to the pattern having the first size from the first image and an image corresponding to the pattern having the second size from the first image.

21. The apparatus according to claim 20, wherein said determination unit determines whether or not to detect an image corresponding to the pattern having the first size from a first region in the second image acquired by said acquisition unit and whether or not to detect an image corresponding to the pattern having the second size from the first region in the second image, in accordance with detection results of detecting an image corresponding to the pattern having the first size from the first region in the first image and an image corresponding to the pattern having the second size from the first region in the first image.

22. The apparatus according to claim 21, wherein said determination unit determines whether or not to detect an image corresponding to the pattern having the first size from a second region in the second image acquired by said acquisition unit and whether or not to detect an image corresponding to the pattern having the second size from the second region in the second image, in accordance with detection results of detecting an image corresponding to the pattern having the first size from the second region in the first image and an image corresponding to the pattern having the second size from the second region in the first image.

23. The apparatus according to claim 20, wherein said acquisition unit acquires a plurality of images including the first image and excluding the second image, and
said determination unit determines whether or not to detect an image corresponding to the pattern having the first size from the second image acquired by said acquisition unit and whether or not to detect an image corresponding to the pattern having the second size from the second image, in accordance with detection results of detecting an image corresponding to the pattern having the first size from the plurality of images and an image corresponding to the pattern having the second size from the plurality of images.

24. The apparatus according to claim 20, further comprising a storage unit which stores evaluation information indicating grades for the detection results obtained by said image detection unit,
wherein said determination unit determines whether or not to detect an image corresponding to the pattern having the first size from the second image acquired by said acquisition unit and whether or not to detect an image corresponding to the pattern having the second size from the second image, in accordance with the evaluation information indicating the grades for detection results of detecting an image corresponding to the pattern having the first size from the first image and an image corresponding to the pattern having the second size from the first image.

25. An image processing method comprising:
an acquisition step of acquiring a first image and a second image;
an image detection step of detecting an image corresponding to a pattern having a first size from the first image acquired in the acquisition step and an image corresponding to a pattern having a second size from the first image; and
a determination step of determining whether an image corresponding to the pattern having the first size is to be detected from the second image acquired in the acquisition step or not and whether an image corresponding to the pattern having the second size is to be detected from the second image or not, in accordance with detection results of detecting an image corresponding to the pattern having the first size from the first image and an image corresponding to the pattern having the second size from the first image.

26. The method according to claim 25, wherein the determination step determines whether an image corresponding to the pattern having the first size is to be detected from a first region in the second image acquired in the acquisition step or not and whether an image corresponding to the pattern having the second size is to be detected from the first region in the second image or not in accordance with detection results of detecting an image corresponding to the pattern having the first size from the first region in the first image and an image corresponding to the pattern having the second size from the first region in the first image.

27. The method according to claim 26, wherein the determination step determines whether an image corresponding to the pattern having the first size is to be detected from a second region in the second image acquired in the acquisition step or not and whether an image corresponding to the pattern having the second size is to be detected from the second region in the second image or not in accordance with detection results of detecting an image corresponding to the pattern having the first size from the second region in the first image and an image corresponding to the pattern having the second size from the second region in the first image.

28. The method according to claim 25, wherein the acquisition step acquires a plurality of images including the first image and excluding the second image, and
the determination step determines whether an image corresponding to the pattern having the first size is detected from the second image acquired in the acquisition step or not and whether an image corresponding to the pattern having the second size is detected from the second image or not in accordance with detection results of detecting an image corresponding to the pattern having the first size from the plurality of images and an image corresponding to the pattern having the second size from the plurality of images.

29. A non-transitory recording medium recording a program to be executed by a computer, the program comprising:
an acquisition step of acquiring a first image and a second image;
an image detection step of detecting an image corresponding to a pattern having a first size from the first image acquired in the acquisition step and an image corresponding to a pattern having a second size from the first image; and
a determination step of determining whether an image corresponding to the pattern having the first size is to be detected from the second image acquired in the acquisition step or not and whether an image corresponding to the pattern having the second size is to be detected from the second image or not in accordance with detection results of detecting an image corresponding to the pattern having the first size from the first image and an image corresponding to the pattern having the second size from the first image.

30. The medium according to claim 29, wherein the determination step determines whether an image corresponding to the pattern having the first size is to be detected from a first region in the second image acquired in the acquisition step or not and whether an image corresponding to the pattern having the second size is to be detected from the first region in the second image or not in accordance with detection results of detecting an image corresponding to the pattern having the first size from the first region in the first image and an image corresponding to the pattern having the second size from the first region in the first image.

31. The medium according to claim 30, wherein the determination step determines whether an image corresponding to the pattern having the first size is to be detected from a second region in the second image acquired in the acquisition step or not and whether an image corresponding to the pattern having the second size is to be detected from the second region in the second image or not in accordance with detection results of detecting an image corresponding to the pattern having the first size is from the second region in the first image and detects an image corresponding to the pattern having the second size from the second region in the first image.

32. The medium according to claim 29, wherein the acquisition step acquires a plurality of images including the first image and excluding the second image, and
  the determination step determines whether an image corresponding to the pattern having the first size is detected from the second image acquired in the acquisition step or not and whether an image corresponding to the pattern having the second size is detected from the second image or not in accordance with detection results of detecting an image corresponding to the pattern having the first size from the plurality of images and an image corresponding to the pattern having the second size from the plurality of images.

\* \* \* \* \*